(12) United States Patent
Li et al.

(10) Patent No.: US 11,507,914 B2
(45) Date of Patent: Nov. 22, 2022

(54) COGNITIVE PROCUREMENT

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Jingyun Fan, Berkeley, CA (US); Cynthia Michelle Barrera, San Antonio, TX (US); Scott Gillette, San Antonio, TX (US); Colin Connors, Campbell, CA (US); Kayhan Moharreri, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 135 days.

(21) Appl. No.: 16/366,773

(22) Filed: Mar. 27, 2019

(65) Prior Publication Data
US 2020/0311668 A1 Oct. 1, 2020

(51) Int. Cl.
*G06Q 10/08* (2012.01)
*G06Q 10/06* (2012.01)

(52) U.S. Cl.
CPC ....... *G06Q 10/0833* (2013.01); *G06Q 10/067* (2013.01); *G06Q 10/06315* (2013.01)

(58) Field of Classification Search
CPC ............. G06Q 10/087; G06Q 10/0833; G06Q 10/0838; G06Q 10/063; G06Q 10/0637; G06Q 40/08; G06Q 10/06315; G06Q 10/067

USPC ... 705/7.36, 7.28, 7.11, 28, 26.81, 334, 333, 705/7.25, 37, 22, 7.12, 1.1, 35; 700/48, 700/44, 95, 104, 246
See application file for complete search history.

(56) References Cited

U.S. PATENT DOCUMENTS

| | | | | |
|---|---|---|---|---|
| 5,737,581 | A | * | 4/1998 | Keane .................... G06Q 99/00 706/920 |
| 10,713,706 | B1 | * | 7/2020 | Thankachan .......... G06N 7/005 |

(Continued)

OTHER PUBLICATIONS

Davis, Tom. "Effective supply chain management." Sloan management review 34 (1993): 35-35. (Year: 1993).*

(Continued)

*Primary Examiner* — Charles Guiliano
*Assistant Examiner* — Letoria G Knight
(74) *Attorney, Agent, or Firm* — Mannava & Kang, P.C.

(57) ABSTRACT

Examples of cognitive procurement are described. In an example embodiment, procurement-specific data sources associated with at least one of a process, an organization, and an industry relevant for procurement operations are monitored. From the monitored procurement-specific data, an operation behavioral pattern is identified. Subsequently, a behavior model of an order is constructed using the operation behavioral pattern and a pre-existing behavior model library. A procurement interaction indicating a query for processing the order is received from a user. The order is tracked by the cognitive order concierge. Using the behavior model, a potential event relating to the order is predicted, the potential event being indicative of an issue affecting the order. Accordingly, the issue affecting the order is proactively remediated to automatically troubleshoot the order. In an example, the user is notified as per the remediation requirement.

14 Claims, 13 Drawing Sheets

(56) References Cited

U.S. PATENT DOCUMENTS

| | | | | |
|---|---|---|---|---|
| 2004/0249482 | A1* | 12/2004 | Abu El Ata | G06T 11/206 700/44 |
| 2012/0323645 | A1* | 12/2012 | Spiegel | G06Q 10/083 705/14.1 |
| 2013/0218616 | A1* | 8/2013 | Pinchuk | G06Q 30/0202 705/7.11 |
| 2014/0019471 | A1* | 1/2014 | Linton | G05B 19/418 707/759 |
| 2014/0222610 | A1* | 8/2014 | Mikurak | G06Q 30/0633 705/26.5 |
| 2014/0337086 | A1* | 11/2014 | Asenjo | H04L 41/0896 705/7.28 |
| 2015/0046363 | A1* | 2/2015 | McNamara | G06Q 10/0635 705/333 |
| 2016/0196527 | A1* | 7/2016 | Bose | G06Q 10/0832 705/332 |
| 2016/0217406 | A1* | 7/2016 | Najmi | G06Q 10/06315 |
| 2017/0154347 | A1* | 6/2017 | Bateman | G06Q 40/08 |
| 2018/0060738 | A1* | 3/2018 | Achin | G06Q 10/04 |
| 2018/0232676 | A1* | 8/2018 | Hlasyszyn | G06Q 30/0641 |
| 2018/0357714 | A1* | 12/2018 | So | G06F 17/18 |
| 2020/0074401 | A1* | 3/2020 | Oliveira Almeida | G06N 5/003 |

OTHER PUBLICATIONS

Helena Carvalho, Ana P. Barroso, Virginia H. Machado, Susana Azevedo, V. Cruz-Machado, Supply chain redesign for resilience using simulation, Computers & Industrial Engineering, vol. 62, Issue 1, 2012, pp. 329-341. (Year: 2012).*

Chengyi Yua et al., "Robotics and Computer-Integrated Manufacturing", "Simultaneous and on-line calibration of a robot-based inspecting system", Shanghai Jiao Tong University, May 23, 2016, (12 pages).

* cited by examiner

COGNITIVE PROCUREMENT

BACKGROUND

Procurement's importance as a key process has increased significantly in recent times. Originally, procurement started as a way to integrate purchasing into supply chain management at a time when most large companies were struggling to manage their operational costs. Currently procurement process starts with a buyer making a procurement request or placing an order. In procurement operations, after the order has been placed, a number of steps are executed to validate the order and track the order. Once validated, the order can be routed to the penultimate step of order preparation, i.e., for assembly of the ordered product or for provisioning for the ordered service, as the case may be. Subsequently, the order is delivered to a client either by shipping, in case of the order being for a product, or by activation, in case of the order being for a service.

Existing source-to-pay or procure-to-pay process or sales operation for any organization often starts with the preparation of purchase requisition. The purchase requisition may lead to multiple vendors submitting quotes in response to RFQ (request for quote) or RFP (request for proposal). An evaluation may be carried out for examining each RFQ or RFP for their eligibility and ability to meet criterion laid out in the purchase requisition. The evaluation of each RFQ or RFP might lead to a sourcing decision being made and a vendor being selected. The vendor may be issued a purchase order. The vendor may now be required to either deal with manufacturing (if required) and logistics of the goods as per purchase requisition. An invoice would be issued by the vendor after the logistics of the good as per the purchase requisition has been accomplished. The organization would receive the goods as per purchase requisition and would proceed for verification that goods received may be harmonious with purchase requisition. When the information is found to be accurate and all parameters are in order, would the invoice be sent to a payment facility.

Accordingly, the sales operation process has multiple milestones and each milestone is vulnerable to an error or an issue that may affect the order. For instance, the steps in the sales operation, which may involve logistics and supply chain activities, may be particularly prone to errors and exceptions that may affect the order delivery. These errors and exceptions may include, for example, unavailability of the product or the occurrence of an event, which may cause delay or cancellation of the order or a problem with shipping of the order.

Accordingly, with present models for automated procurement the exceptions are usually detectable when the process reaches the milestone, which is affected by the exception, thereby leaving little room and time for managing the exception in an effective manner. Consequently, the order is either delayed or is unable to be fulfilled, and such order handling and management may adversely affect business. Accordingly, a technical problem with the currently available procurement processes is that they may be inefficient, inaccurate, and/or not scalable.

There is a requirement for systems and methods that may increase pro-activeness and agility in tracking orders for their potential lateness of delivery, especially focusing on value-critical ones. There is also a need for reducing risks of client costs incurred and delays caused by late supplier deliveries. Furthermore, there is a need for an optimized procurement concierge that is capable of continuous sourcing paradigm, which includes the constant sensing of emerging issues, exceptions, emerging risks and opportunities, the evaluation of recommendations, improve delivery assurance, increased agility in tracking orders for their potential lateness of delivery, and an increased productivity of communications with suppliers in such order tracking to negotiate the best possible outcomes.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
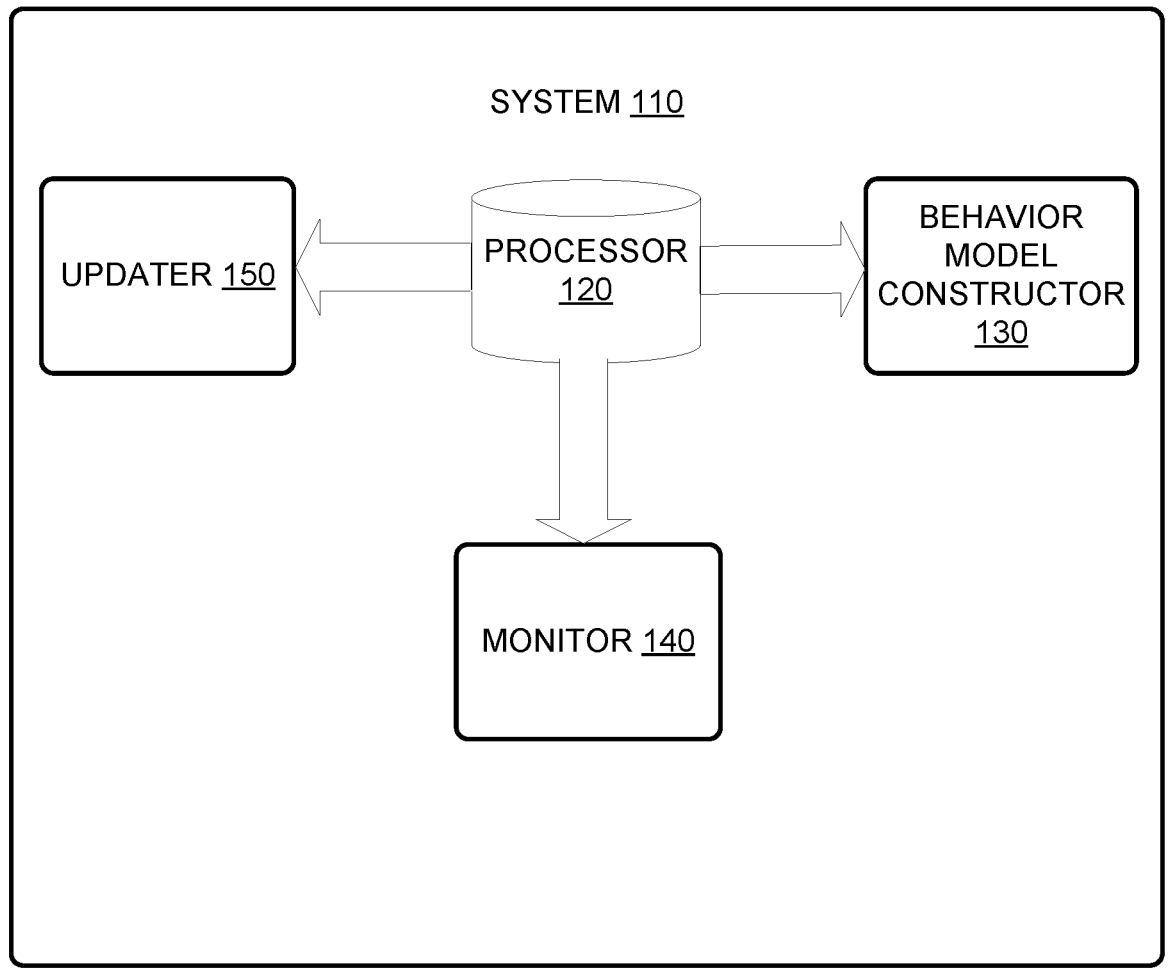
FIG. 1 illustrates a block diagram schematic of an intelligent order concierge system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes aspects relating to automated order troubleshooting and intelligent purchase order processing. In one example, the aspects described in the present disclosure facilitate in either handling the order after the order has been placed by a client and received at the service provider, or in placing the order in the first place, in a manner that addresses the latent requirements and factors that are not evidently perceivable. For purposes of this disclosure, the term client is used to indicate any party that is placing orders, whereas the term service providers has been used to indicate any party that sells, manufactures, or otherwise provides goods, products, and services to clients.

From the client's point of view, the techniques of the present disclosure provide a customized order, which adequately meets their requirements, while taking into account industry trends and practices. At the same time, for instance, any social, economic, or political situation that can affect the business, the industry trends and, therefore, the order, are considered while placing the order. In addition, the present disclosure provisions the same from the service provider's point of view. For instance, given the industry norms, the service provider may be able to effectively cater to the client requirements, keeping in mind the various factors, past, present, and future, that can affect the fulfillment of the order or affect the demand which gave rise to the order.

To begin with, as an example, the techniques for intelligent order concierge are manifested in two stages, from an implementation perspective. First, a behavior model which captures operation behavioral pattern indicative of procurement-specific behavior associated with a process, and organization and industry, or a combination thereof. In other words, the behavior model captures an operation behavioral pattern that is followed by clients in relation to a specific process, or by the client organization, or by the industry that the client belongs to. In the second stage, the behavioral model is deployed when an order is placed or received, as the case may be. The behavior model is deployed to gauge the past, present, and the future scenarios, for determining whether the order can be affected or not, and if it can be affected, automatically troubleshooting the order in order to mitigate or completely prevent the order from being affected.

In operation, as part of the model construction, procurement-specific data sources associated with a process, an organization, an industry, or a combination thereof relevant for procurement operations can be monitored. In an example, the process, the organization, and the industry that is relevant to the procurement operation can be selected based on the operation of the party implementing the techniques of the present disclosure. For the purposes of this disclosure, the term "procurement operation" intends to cover the sales operations or procurement operations conducted by a service provider in a manner of selling the product and the services as well as the operation by a client in a manner of placing orders for the products and services offered by various service providers, sellers, and manufacturers.

For instance, in case the party implementing the intelligent order concierge technique of the present disclosure is the service provider, then the process or the organization or the industry can be related to either the client that the service provider caters to or the industry or field that the service provider operates in. On the other hand, for instance, if the party implementing the intelligent order concierge is a client, then the monitoring of the process, the organization, and the industry can be related to the industry or field that the client operates in or the standard industry-specific processes that the client would implement. The monitoring of the sales operations can be achieved, in real-time, by querying various databases and repositories of information, online as well as offline, from which the relevant data can be retrieved. For example, social media, online web portals, and other websites that carry information regarding the process, the organization, the industry, or a combination thereof can be crawled for retrieving and monitoring the above mentioned information.

Once the procurement-specific data has been retrieved and stored, an operation behavioral pattern can be identified based on the procurement-specific data. In an example, the behavioral pattern so identified can indicate, based on the procurement-specific data, the current and future trends that can affect, for instance, demand and supply in the industry, and difference in the current trends from previous trends. The operation behavioral pattern can be identified using the procurement-specific data based on predefined rules, the predefined rules mirroring the process, the organization, and the industry relevant for the party conducting the intelligent order concierge. In an example, the predefined rules can be based on historically recorded cases for that ordering process in that industry, process, organization, and the like.

With the operation behavioral pattern ascertained, the behavior model is then constructed of an order to emulate the monitored procurement-specific data as well as the operation behavior pattern as mentioned above. In an example, a pre-existing behavior model library can be the basis for constructing the behavior model along with the operation behavioral pattern. For instance, the pre-existing behavior model library can serve as a template for generating the behavior model which attempts to mimic the operation behavioral pattern. According to an aspect, the order is associated with at least one of the procurement-specific data sources, which in turn associates the behavior model with the procurement-specific data sources. In an aspect the intelligent order concierge receives a procurement interaction from a user. The procurement interaction to indicate a query sent by a user to the system for processing the order. The intelligent order concierge may use the behavior model and the procurement interaction in order to facilitate placement of the order associated with at least one of a process, an organization, and an industry relevant for procurement operations. This concludes first phase of intelligent order concierge with the construction of the behavior model and placement of the order.

As mentioned previously, in the second phase, the behavior model is implemented for order management, and for automatically remediating orders, where necessary. The automation of remediation implies that there is no human intervention at any stage, and the process of order handling, management, and troubleshooting is machine-executed. In the second phase, the behavior model and the associated processes are triggered as soon as an order is placed to ensure resolution of issues accurately. The intelligent order concierge traces the procurement operation from order placement to final delivery for achieving the capability of predicting the potential event. In an example, the intelligent order concierge may include an order tracker to interact with procurement-specific data sources for retrieval of status of the order.

As part of deployment of the behavior model, any potential event relating to the order received to be fulfilled using the procurement operation is predicted based on the behavior model. The potential event is indicative of an issue that can affect the order directly or indirectly. For example, a direct influence can be in the form of a real and present event, such as a natural calamity, that can affect the order fulfillment. An indirect influence can be in the form of an economic, political, or social situation brewing in a region, which may affect demand or supply, in turn, potentially affecting the order. In addition, as mentioned previously, the prediction of the order being affected can be from the point of view of the service provider or of the consumer. In either case, the factors may be same or similar. As mentioned previously, the behavior model is built to trace the procurement operation from order placement to final delivery to predict the potential event.

In an example, as part of the prediction of the potential event, an investigation of previously encountered exceptions during procurement process and previously raised issues during procurement process may also be done to identify the potential event or issue affecting the order. Further, the present disclosure provides aggregation of newfound influencers in the behavioral model. Accordingly, in one example, the order is investigated to determine whether the order conforms to the behavioral model or not, which, as mentioned above, is done on the basis of the operation behavioral pattern associated with that order. In the eventuality that the order does not conform to the behavioral model, a hypothesis is generated for that order and the hypothesis incorporated in the behavioral model, so as to enable prediction of the potential event even in such an eventuality. In other words, in case the order does not conform to the behavior model, which means that the behavior model is unable to accurately mirror the operation pattern, then this new behavioral pattern is incorporated into the behavior model.

In case an event that may potentially affect the order is predicted, an automatic troubleshooting of the event may be initiated and proactive remediation of the issue affecting the order may be achieved. For example, in one case, a hypothesis is generated based on historical data and a recommendation for resolving the issue is provided based on the hypothesis. In addition, as part of automation of order remediation, an alert can be generated for all users such as stakeholders, such as sales team, operations team, delivery teams, and validation teams, in the sales operation, in response to the prediction of the potential event which in turn indicates the issue affecting the order. This may allow the users to pre-emptively provide a resolution to the identified issue.

FIG. 1 illustrates an intelligent order concierge environment 110, which may include a system 110 for providing automated order troubleshooting, according to an example embodiment of the present disclosure. For the purposes of this disclosure, the intelligent order concierge system 110 is referred to as the system 110. In an example embodiment, the system 110 facilitates in either handling the order after the order has been placed by a client and received at the service provider, or in placing the order in the first place, in a manner that it addresses the latent requirements and factors that are not evidently perceivable. Accordingly, the system 110 may be deployed at either the client end or at the service provider end. As mentioned previously also, though the term procurement operation has been used previously as well as henceforth, it will be understood that the term means to cover the procurement operations conducted by a service provider in a manner of selling the product and the services as well as the operation by a client in a manner of placing orders for the products and services offered by various service providers, sellers, and manufacturers.

At the client end, in an example, the system 110 may provide a tailor-fitted order, which adequately meets their requirements, while taking into account industry trends and practices. At the same time, the system 110 may also consider external, possibly hidden factors, for instance, any social, economic, or political situation, that can affect the business, the industry trends, the market demand, and therefore, the order, while placing the order. In an example, the system 110 may facilitate payments once the order has been fulfilled. The system 110 may facilitate dialog between client and service providers as per requirement of the order. The system 110 generate an automated communication with the client or the vendor after prediction of any issue affecting an order. In addition, the system 110 may provide a similar facility when implemented at the service provider's end. For instance, the system 110 may be able to take into account the industry norms and various other factors that can affect the fulfillment of the order or affect the demand, which gave rise to the order in the first place, to allow the service provider to effectively cater to the client requirements.

As part of achieving the above function, the system 110 can include a processor 120, a behavior model constructor 130, a monitor 140 and an updater 150. The processor 120 may be coupled to the behavior model constructor 130, the monitor 140 and the updater 150.

In an example, the behavior model constructor 130 may construct a behavior model that can mirror the various factors that may influence an order, whereas the updater 150 can use the behavior model and provide automated order remediation. In addition, the updater 150 may also include provisions for improving the behavior model in cases where the behavior model is unable to cater to a situation. The behavior model constructor 130, and the updater 150 may include other components, which are explained in detail by way of FIG. 2.

In accordance to an embodiment of the present disclosure, the behavior model constructor 130 may be configured to monitor procurement-specific data sources associated with at least one of a process, an organization, and an industry relevant for procurement operations. The behavior model constructor 130 may further identify an operation behavioral pattern from the monitored procurement-specific data. A behavior model may be constructed for an order using the operation behavioral pattern and using a pre-existing behavior model library. In an example, a pre-existing behavior model library can be the basis for constructing the behavior model along with the operation behavioral pattern. For instance, the pre-existing behavior model library can serve as a template for generating the behavior model which attempts to mimic the operation behavioral pattern. The order may be associated with at least one of the procurement-specific data sources. In an example, the procurement-specific data sources further comprise at least one of the list of suppliers, features, benefits, cost, availability, location, delivery method of goods, services, and information, innovation assessment, risk assessment, technology assessment, supplier collaboration from receive supplier data and the like.

In an example, a procurement interaction may be received from a user, for instance, by the monitor 140. The procurement interaction may indicate a query sent by the user to the system 110 for processing an order. In an example, the order may comprise procurement of goods and services. The monitor 140 may be configured to facilitate placement of the order. In an example, the order may be associated with at least one of a process, an organization, and an industry relevant for procurement operations.

The system 110 may be configured so that the updater 150 may be configured to interact with procurement-specific data sources for retrieval of status of the order. The updater 150 may trace the order from placement of the order to final delivery. The updater 150 may be configured to deploy the behavior model to predict a potential event relating to the order received to be fulfilled using the procurement interaction, based on the behavior model, wherein the potential event is indicative of an issue affecting the order. In other words, the updater 150 may facilitate the behavior model can attempt to capture as many as possible points of failure in the sales-to-delivery process in order management. In an example, the updater deploys the behavior model constructed by the behavior model constructor 130 through the processor 120. The updater 150 may be configured to proactively remediate the issue affecting the order to automatically troubleshoot the order. In an example the updater 150 facilitates resolution of the issue affecting the order on day zero (0) status in real time. In accordance to an embodiment of the present disclosure the updater 150 may be configured to facilitate interaction of the user with procurement-specific data sources as per requirement of the issue affecting the order. In an example, the updater 150 may be configured to resolve the issues affecting the order from day 0 of an invoice raised for an order and obtain a commitment to pay before due date. In an example, the updater 150 may proactively guide the user of the system 110 in anticipation of potential needs. The user of the system 110 may be service providers, employees of an organization, which has procurement requirements, clients, vendors of various goods and services and the like. The updater 150 may be configured to reach out to providers before inquiries and complaints are raised, so as to effective resolve, remediate or rectify any issues affecting the order before such issues arise.

Figure 2:
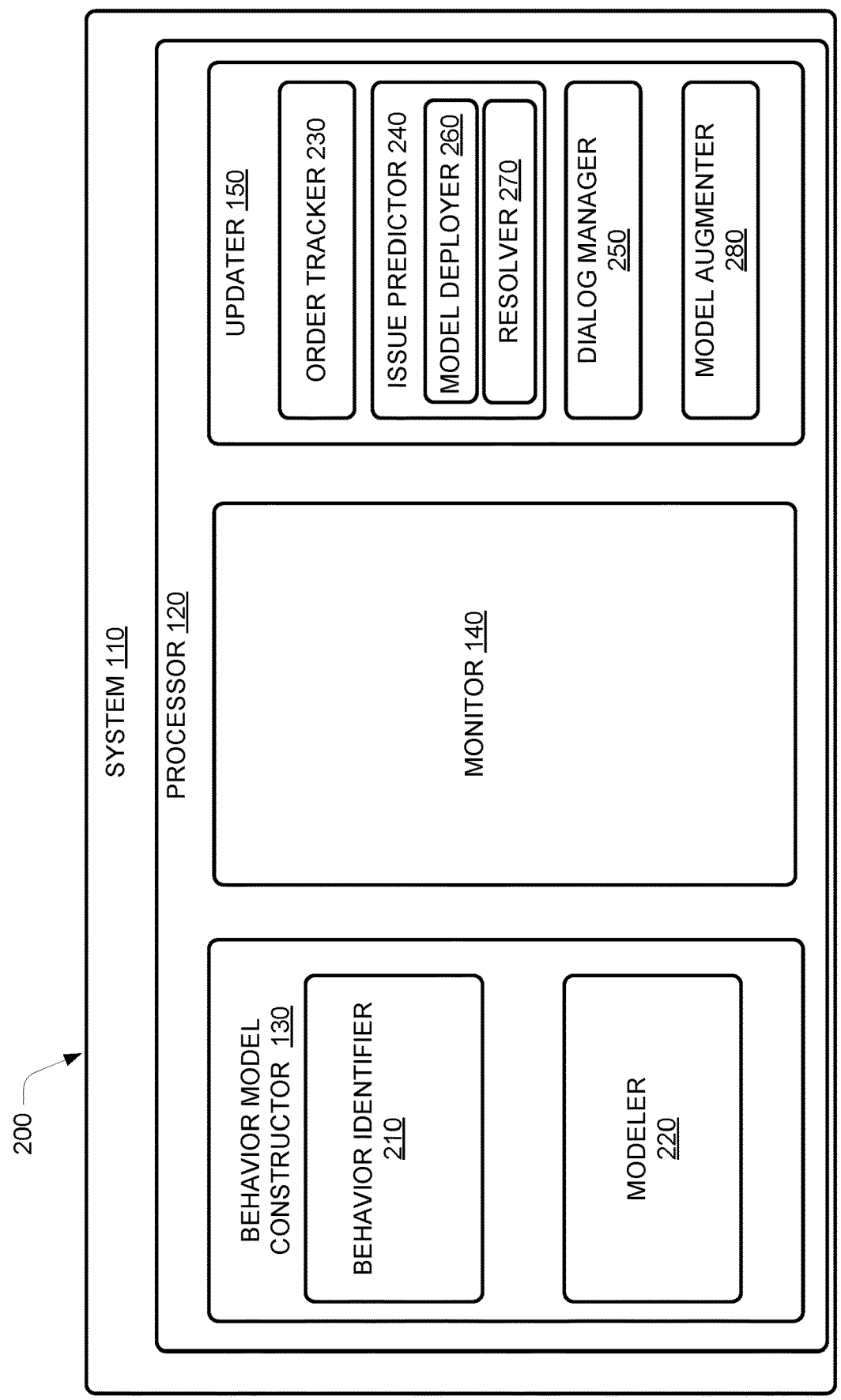
FIG. 2 illustrates components of the intelligent order concierge system for the purposes of providing automated order tracking and issue resolution, according to an example embodiment of the present disclosure.

FIG. 2 illustrates components of the intelligent order concierge system for the purposes of providing automated order tracking and issue resolution, according to an example embodiment of the present disclosure.

In accordance to an embodiment of the present disclosure, the behavior model constructor 130, the monitor 140 and the updater 150 may further include various components in order to carry out the technique described by the system 110. The behavior model constructor 130 may include a behavior identifier 210 and a modeler 220 to facilitate the behavior model constructor 130 into accomplishing various functions of the system 110. Further, the updater 150 may include an order tracker 230, an issue predictor 240, a dialog manager 250, and a model augmenter 280. The issue predictor 240 may further include a model deployer 260, and a resolver 270 to facilitate the updater 150 into accomplishing various functions of the system 110.

In an example, the system 110 is configured so that the behavior model constructor 130, the monitor 140 and the updater 150 operate in synchronization through the processor 120, from an operation perspective. The system 110 may be configured so that the technique of described herein is implemented in 3 phases.

In the first phase, the behavior model constructor 130 builds a behavior model, which captures operation behavioral pattern indicative of procurement-specific behavior associated with a process, and organization and industry, or a combination thereof, associated with the party implementing the system 110. In the second phase the monitor 140 receives a procurement interaction from a user, the procurement interaction to indicate a query sent by a user to the system for processing the order. The monitor 140 may facilitate placement of the order associated with at least one of a process, an organization, and an industry relevant for procurement operations. In the third phase then, the updater 150 deploys the behavioral model when the order is placed or received, as the case may be. In an example, the updater 150 deploys the behavior model to predict a potential event relating to the order received to be fulfilled using the procurement interaction described by way of FIG. 1. In an example, the potential event may be an issue affecting the order. In an example, the updater 150 deploys the behavior model to gauge if the issue affecting the order may be related to manufacturing of the order, if the order requires manufacturing of a product before delivery. In an example, the updater 150 deploys the behavior model to gauge the issue affecting the order may be related to shipping of the order after it has left the service provider site and is in transit to client site. Accordingly, the updater 150 may initiate an automatic remediation for the issue to mitigate or completely prevent the order from being affected.

In an aspect, the behavior model constructor 130 may be coupled to the processor 120. The behavior model constructor 130 may include a behavior identifier 210, and a modeler 220. The behavior identifier 210 may be configured to monitor procurement-specific data sources associated with at least one of a process, an organization, and an industry relevant for procurement operations. The behavior identifier 210 may be configured to identify an operation behavioral pattern from the monitored procurement-specific data.

In operation, as part of the model construction, the pattern identifier 102 can monitor, in real time, various sources of information that can be relevant for maintaining a watch over the factors that could possibly influence the completion or non-completion of an order whether for a service provider or for a client. Accordingly, the behavior identifier 210 monitors procurement-specific data sources associated with a process, an organization, an industry, or a combination thereof relevant for procurement operations can be monitored. In an example, the process, the organization, and the industry that relevant for the procurement operation can be selected based on the operation of the party implementing the techniques of the present disclosure.

For instance, in case the implementer of the system 110 is the service provider, then the process or the organization or the industry can be related to either the client that the service provider caters to or the industry or field that the service provider operates in. On the other hand, for instance, if the implementer of the system 110 is a client, then the monitoring of the process, the organization, and the industry can be related to the industry or field that the client operates in or the standard industry-specific processes that the client would implement. The behavior identifier 210 can, in real-time, query various data bases and repositories of information, online as well as offline, from which the relevant data can be retrieved. For example, the behavior identifier 210 may query social media, online web portals, and other websites that carry information regarding the process, the organization, the industry, or a combination thereof, which can be crawled by the behavior identifier 210 for retrieving and monitoring the above-mentioned information.

Once the sales-specific data has been retrieved and stored, the behavior identifier 210 may identify an operation behavioral pattern based on the procurement-specific data. In an example, the behavioral pattern so identified by the behavior identifier 210 may indicate fluctuations in manufacturing patter of a particular service provider. In an example, the behavioral pattern so identified by the behavior identifier 210 may indicate shipping and transit related fluctuations for a particular product, service provider and the like. The behavior identifier 210 may identify the operation behavioral pattern using the procurement-specific data based on predefined rules, which may attempt to emulate the process, the organization, and the industry relevant for the implementer conducting the intelligent order and purchase order concierge. In an example, the predefined rules can be based on historically recorded cases for that ordering process in that industry, process, organization, and for that implementer.

With the operation behavioral pattern ascertained, the modeler 220 may construct a behavior model for an order using the operation behavioral pattern and using a pre-existing behavior model library. In an example, the modeler 220 can take into account a pre-existing behavior model library as the basis for constructing the behavior model. For instance, the modeler 220 can use the pre-existing behavior model library as a template for generating the behavior model which attempts to mimic the operation behavioral pattern. In an example, the order may be a service requested by a client. In an example, the order may be request for manufacturing a particular category of goods. In an example, the order may be a new order placed by a new client to a new service provider. In an example, the order may be an ongoing contract that a client may have with a service provider regarding delivery of goods and services are required times. In an example, the modeler 220 may be configured to associate the order with at least one of the procurement-specific data sources.

In an aspect the monitor 140 may be coupled to the processor 120. The monitor 140 may receive a procurement interaction from a user, the procurement interaction to indicate a query sent by a user to the system for processing the order. The procurement interaction may indicate the query sent by the user to the system for processing procurement of goods and services. In an example, the procurement interaction of the user further comprises at least one of screening historical procurement requests, investigating cost fluctuations, developing requests for proposals, tracking for promotions, setting up procurement recommendations, monitoring procurement guidelines being adhered to, and monitoring acquisition of goods, services, or information. The monitor 140 may be configured to facilitate placement of the order associated with at least one of a process, an organization, and an industry relevant for procurement operations.

In an example in accordance with the present disclosure, the behavior model constructed by the behavior model constructor 130 may be an order behavior model. This model is explained in detail by way of FIG. 3 and FIG. 4 below. The order behavior model may comprise elements of order behavior after placement of the order like goods overdue, goods received, invoice issues, payment clearance and the like. In an example in accordance with the present disclosure, the behavior model constructed by the behavior model constructor 130 may be an environment behavior model. This model is explained in detail by way of FIG. 3 and FIG. 5 below. The environment behavior model may comprise elements of environment behavior after placement of the order like shipping, manufacturing, transit, payments and the like. In an example in accordance with the present disclosure, the behavior model constructed by the behavior model constructor 130 may be a combination of the environment behavior model and the order behavior model.

It should be understood that the behavior model so constructed also takes into account industry knowledge, to accurately represent the operation behavioral patterns relevant to a specific industry. For example, the industry-type may range from financial industry, pharmaceutical industry, oil & gas industry, and retail industry. In each industry, the work protocols or workloads may be specific to every industry, and therefore need for different behavior models. For example, in the pharmaceutical industry, the resource intensive workloads may include gene sequencing workloads, personal medicine workloads, adverse drug reaction capturing workloads, and regulatory compliance workloads. In another example, in the oil & gas industry, the resource intensive workloads can include oil & gas exploration workloads and seismic migration workloads. In yet another example, in the retail industry, the resource intensive workloads can include cross-selling or up-selling recommendation workloads, supply chain optimization workloads, post-payment audit workloads, and client onboarding workloads.

In an aspect the system 110 comprises the updater 150 coupled to the processor 120. The updater 150 may further include the order tracker 230, the issue predictor 240, the dialog manager 250 and a model augmenter 280. The issue predictor 240 may further include the model deployer 260, the resolver 270, to facilitate the updater 150 into accomplishing various functions of the system 110.

In an aspect, the order tracker 230 may be configured to interact with to interact with procurement-specific data sources for retrieval of status of the order. The order tracker 230 is to trace the order from placement of the order to final delivery of the order with procurement-specific data sources for retrieval of status of the order.

In an example, the updater 150 may be configured so that the issue predictor 240 may deploy the order tracking data generated by the order tracker 230 and the behavior model to predict a potential event relating to the order received to be fulfilled using the procurement interaction, based on the behavior model. The potential event may be indicative of an issue affecting the order. In an example, the issue predictor 240 is to investigate previously encountered issues during any of the historical procurement interactions to identify the issue affecting the order. The issue predictor 240 may conduct an investigation of previously encountered exceptions during sales process and previously raised issues during sales process to identify the potential event or issue affecting the order. In addition, in the example, as part of the investigation, the issue predictor 240 may further collect evidence in the form of historical cases.

In an example, the issue affecting the order may be any of the goods being overdue, warehousing issues, manufacturing issues—if the order needs to be manufactured first, invoice issues, payment issues, shipping issues and the like. The invoice issues may include non-receipt of invoice with goods being received, non-generation of invoice with goods being shipped.

In an aspect, the model deployer 260 of the issue predictor 240 through the behavior model, may attempt to capture various potential events from steps of the procurement operation, in which each step has been identified as an issue-causing juncture affecting the order in the procurement operation. In an example, the issue predictor 240 is triggered for deploying the behavior model as soon as an order is placed by the client or received by the service provider, as the case may be.

As part of deployment of the behavior model, the model deployer 260 uses the behavior model to predict any potential event relating to the order that will be fulfilled using the procurement operation. The model deployer 260 may predict the potential event to indicate an issue that can affect the order directly or indirectly. For example, a direct influence can be in the form of a real and present event, such as a natural calamity, that can affect the order fulfillment. In another example, a direct influence may be a shipping delay due to various regulations and compliance issues. An indirect influence can be in the form of an economic, political, or social situation brewing in a region which may affect a demand or supply which, in turn, affects the order.

In addition, the model deployer 260 may predict the order being affected from the point of view of the party implementing the system 110, i.e., the service provider or the client. In either case, the model deployer 260, in an example, may identify that the potential event can be the same, and may equally affect the clients as well as service providers. As mentioned previously, the model deployer 260 uses the behavior model and date received from the order tracker 230 to trace the sales operation from order placement to final delivery to assess each point of failure along the way so as to accurately predict the potential event, subsequently, its effect on the order, and may recommend a possible resolution.

In an example, as part of the prediction of the potential event, the model deployer 260 may generate a hypothesis based on historical data; and provide a recommendation based on the hypothesis to remediate the issue. The issue may be an issue affecting the order. In case an event that can potentially affect the order is predicted by the issue predictor 240, the resolver 270 may be configured to proactively remediate the issue affecting the order to automatically troubleshoot the order.

For example, in one case, as part of the proactive remediation, the model deployer 260 may generate a hypothesis based on the historical case data and then build a recommendation based on the hypothesis for remediating the issue. The resolver 270 may perform the action recommended by the model deployer 260 based on hypothesis for remediating the issue. In an example, the recommendation can be in the form of an action item that can be performed by the implementer of the system 110 to mitigate the effects of the issue on the order or to altogether avoid the effects.

In addition, as part of automation of order troubleshooting, the updater 150 further includes the dialog manager 250. The dialog manager 250 may be configured to facilitate interaction of the user with procurement-specific data sources as per the requirement of the issue affecting the order. The interaction of the user with procurement-specific data sources is explained in detail by way of FIG. 7 below.

The updater 150 may be configured to generate an alert for the user, in response to the prediction of the potential event through the dialog manager 250. For example, the system 110 may an alert or all stakeholders, such as sales team, operations team, delivery teams, and validation teams, in the sales operation, in response to the prediction of the potential event, which may allow the stakeholders to pre-emptively provide a resolution to the issue associated with the predicted event. In an example, the updater 150 may be configured to generate an automated communication with at least one of the procurement-specific data sources and the user after prediction of the issue affecting the order through the dialog manager 250. In an example, the dialog manager 250 may generate an alert for the stakeholders regarding completion of order and provide clearance for payments.

The alert generator may be for example, be an automated communication, a voice message, a text message, a chatting interface, and an electronic mail.

Further, the system 110 may also provide aggregation of newfound influencers, which were earlier, either not known or not considered, in the behavioral model. Accordingly, in one example, the updater 150 comprises the model augmenter 280. The model augmenter 280 may be configured to investigate the order to determine whether the order conforms to the behavioral model or not, based on the operation behavioral pattern associated with the order. For instance, the model augmenter 280 can determine whether the current order falls within the category of known operation behavior patterns or is it an outlier. The model augmenter 280 may generate a hypothesis for the order, when the order does not conform to the behavioral model. The hypothesis may indicate that the behavior model is unable to accurately mirror the operation pattern. The model augmenter 280 may incorporate the hypothesis in the behavioral model to predict the potential event affecting the order.

In the eventuality that the model augmenter 280 determines that the order does not conform to the behavioral model, the model augmenter 280 further generates a hypothesis for that order and incorporates the hypothesis in the behavioral model, so as to enable prediction of the potential event even in such an eventuality. In an example, the model augmenter 280 can, based on the hypothesis, generate a recommendation as to the changes in the behavioral model, which would accommodate the impact due to the new order.

Figure 3:
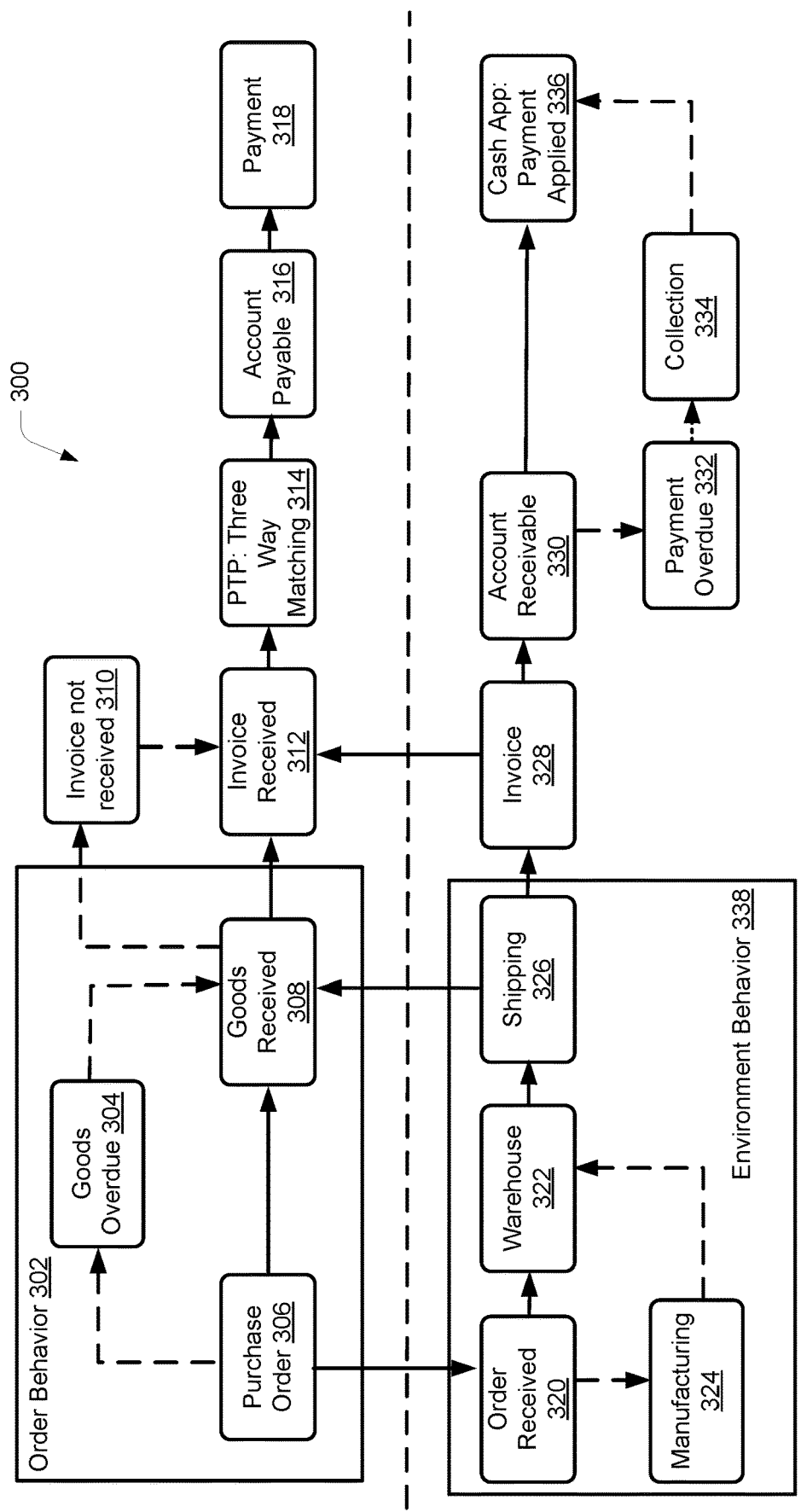
FIG. 3 illustrates a holistic view of an order behavior model and an environment behavior model, according to an example embodiment of the present disclosure.

FIG. 3 illustrates a holistic view of an order behavior model and an environment behavior model, according to an example embodiment of the present disclosure. In an aspect, the behavior model constructed by the behavior model constructor 130 may be an order behavior model. In an example, the behavior model constructed by the behavior model constructor 130 may be an environment behavior model. The order behavior model and the environment behavior model, both are involved in successful execution of the order. FIG. 3 describes an interaction of an order behavior model 302 and an environment behavior model 338. The order behavior model 302 and the environment behavior model 338 may be separated by a dotted line 340. The dotted line 340 is for demonstration purpose only.

The order behavior model 302 includes a purchase order 306. The purchase order 306 may be the order received the monitor 140 through the procurement interaction of the user. In an example, the purchase order 306 may be a new order for procurement of goods and services. In an example, the purchase order 306 may include order of goods overdue 304. The overdue goods 304 order may be follow-up order as a result of a previously placed order being over due as depicted by the block 304. The purchase order 306 may be received by the service provider at block 320. The block 306 of purchase order and block 320 of order received depict interaction of order behavior model 302 with environment behavior model 338. The purchase order 306 and the order received 320 may be the same and used herein interchangeably and may be depicted as different blocks due to difference in the behavior models. The updater 150 would start tracking the order at step 306 and would interchange between the order behavior model 302 and the environment behavior model 338. For sake of brevity the description for FIG. 3 would only mention exemplary steps depicted for the order behavior model 302 and the environment behavior model 338.

In an example, where the purchase order 306 constitutes manufacturing of a commodity—the order received 320 is sent to a manufacturing unit 324. The manufacturing unit 324 may send the order received 320 to the warehouse 322 after manufacturing for the order received 320 is complete. In an example, where the purchase order 306 does not require manufacturing, it is sent to the warehouse 322. Subsequently, the order received 320 may be sent to a shipping unit 326. The order tracker 230 described above by way of FIG. 2 tracks the progress of purchase order 306 through the order received block 320, the manufacturing unit 324, the warehouse 322, and the shipping unit 326. Herein the environment behavior model 338 interacts with the order behavior model 302 and purchase order 306 is depicted as good received at block 308 in the order behavior model 302. The step 308 would only be complete when goods are received by the client. In an example, the goods may be as ordered by the purchase order 304. In an example, the goods may be as ordered earlier and may be overdue as depicted by block 304.

The updater 150 may track an invoice 328 after goods are received by the client at 308. The invoice 328 may be sent to the client after goods have been received by the client as depicted by block 312. In an example, the invoice 328 may be a part of the environment behavior model 338. In an example, the order behavior model 302 may recognize that goods have been received at block 308, however invoice has not been received as depicted by 310. The dialog manager 250 of the updater 150 would then interact with stakeholders and intimate non-receipt of invoice. The dialog manager 250 may generate alerts till the invoice 328 is received as depicted by block 312.

The updater 150 may perform a three-way matching after receipt of invoice 312 at block 314. The purchase order 306, the goods received 308 and the invoice received 312 are matched together at block 314. After successful three-way matching the account for purchase order 306 becomes payable at block 316. In an example, the updater 150 may facilitate payments as depicted by block 318. On the side of the service provider, once invoice 328 is generated, the account for the order received 320 becomes account receivable 330. In an example, if the system 110 is deployed by the service provider, the updater 150 would generate alerts for a payment being overdue at block 332. In an example, the dialog manager 250 may facilitate payment collection 334. The order tracker 230 would track payments of the purchase order 306 till final payment is made or received at block 336. The system 110 may be deployed by the client as well as the service provider and the system 110 would deploy behavior models to recognize payments to track till final payment 336 is received.

Figure 4:
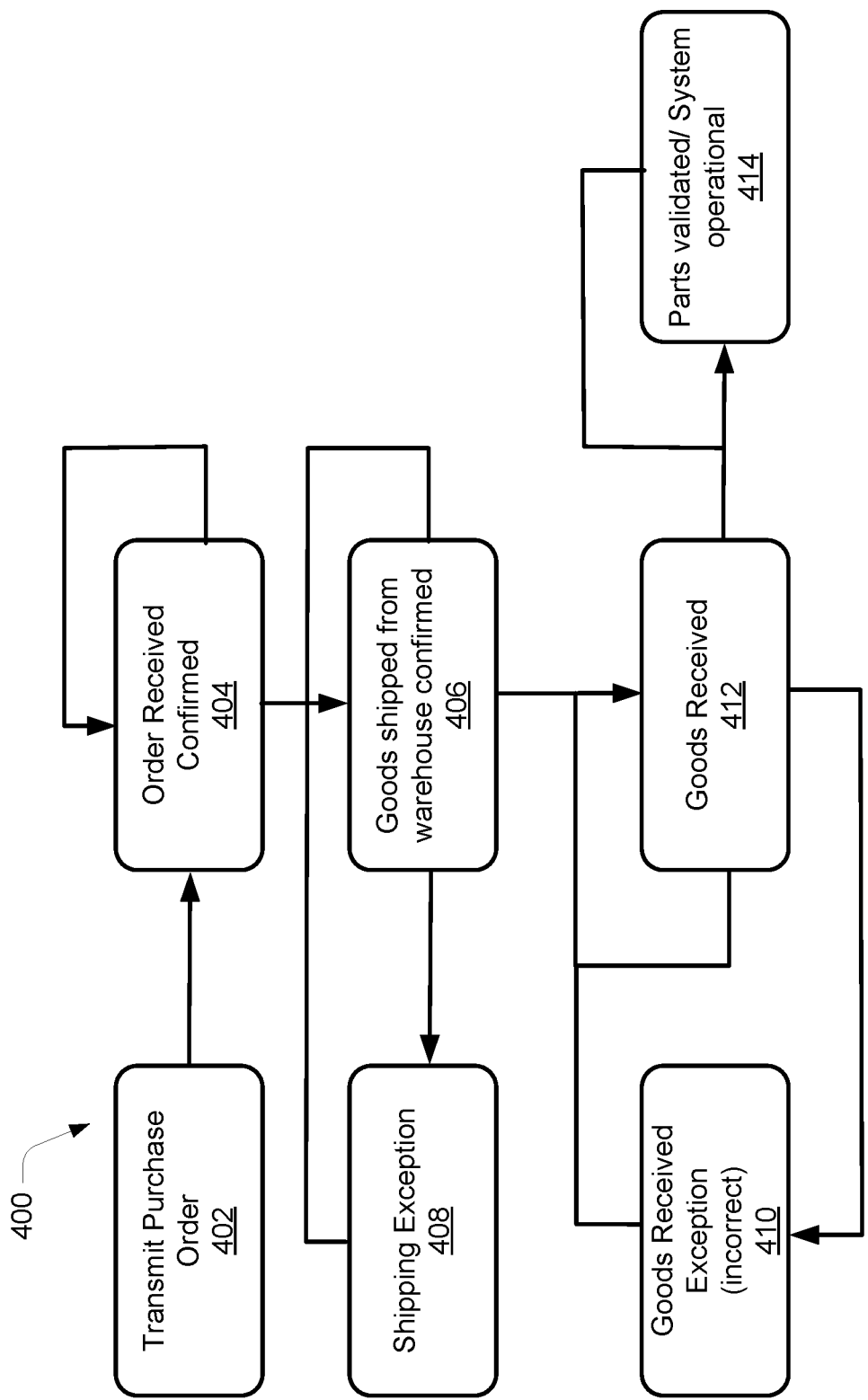
FIG. 4 illustrates the order behavior model of FIG. 3, according to an example embodiment of the present disclosure.

FIG. 4 illustrates an order behavior model 400, according to an example embodiment of the present disclosure. In an example, the order behavior model 400 may be same as the order behavior model 302 depicted by way of FIG. 3. The order behavior model 400 may be related to shipping of goods pertaining to an order. It should be understood that there can be many similar behavior models that the system 110 could make for various orders. The system 110 may make multiple behavior models for a single order. As described above, all the behavior models are stored in a library and are used for augmentation, formation, deployment of present and future models. Any of the behavior models may be used for intelligent order processing.

In accordance with an example of the present disclosure, the order behavior model 400 (referred to as model 400 herein) includes a step of transmitting purchase order at block 402. The purchase order may be the purchase order 306. The purchase order may be a new order different from the purchase order 306. The transmitted purchase order 402 is followed by a receiving a confirmation 404. In an example, the confirmation 404 may be received from the side of service provider if the system 110 has been deployed by the client. In an example, the confirmation 404 may be received from the side of client if the system 110 has been deployed by the service provider. After receiving confirmation 404, the model 400 received a confirmation 406 regarding shipping of the goods included in the order. In an example, there is an issue with the shipping of the order, the model 400 records the same as a shipping exception 408. The order tracker 230, may then constantly query the procurement related sources related to the order regarding shipping information. The resolver 270 would perform remediation or alert stakeholders regarding the shipping exception 408. The process would continue till the shipping exception 408 is resolved and confirmation 406 is received by the order tracker 230. In an example, the model augmenter 280 would record the shipping exception 408 for future reference and updating of model 400. In an example the model 400 may be constructed so that the issue predictor 240 may predict the shipping exception 408 and the resolver 270 may perform proactive remediation so that the shipping exception 408 may be circumvented.

In an example, a confirmation 412 may be received by the system 110 when goods have been received by the client. In an example, goods may not be received by the client, then a receiving exception 410 is recorded by the model 400. The order tracker 230, may then constantly query the procurement related sources related to the order regarding good receiving information. The resolver 270 would perform remediation or alert stakeholders regarding the receiving exception 410. The process would continue till the receiving exception 410 is resolved and confirmation 412 is received by the order tracker 230. In an example, the model augmenter 280 would record the receiving exception 410 for future reference and updating of model 400. In an example the model 400 may be constructed so that the issue predictor 240 may predict the receiving exception 410 and the resolver 270 may perform proactive remediation so that the receiving exception 410 may be circumvented. Subsequent to receiving the confirmation 412, the model 400 includes a validation 414. The validation 414 may include checking if good or service received are correct. In an example, any of the components of the system 110 may be involved in construction and working of the model 400.

Figure 5:
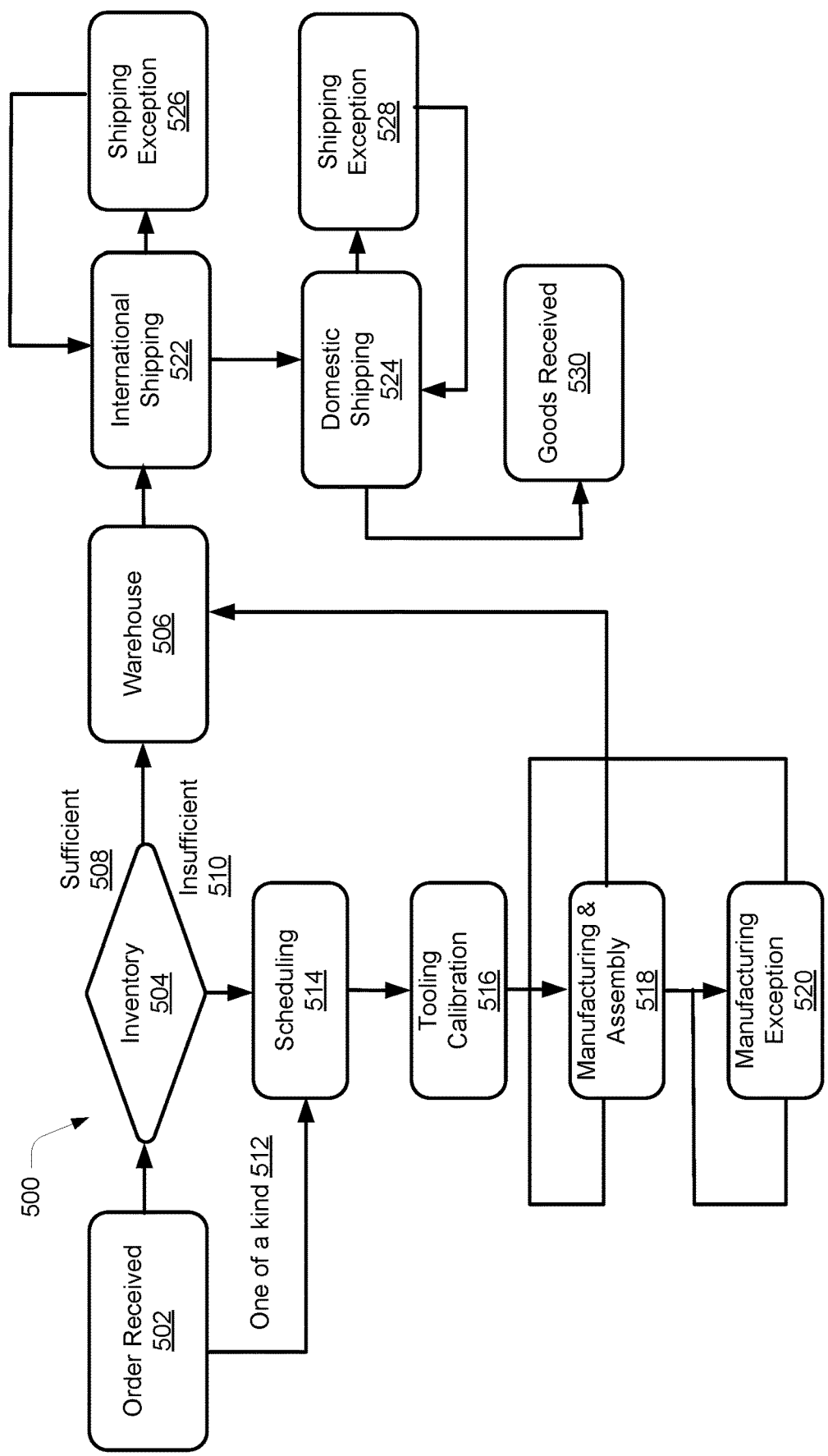
FIG. 5 illustrates the environment behavior model of FIG. 3, according to an example embodiment of the present disclosure.

FIG. 5 illustrates an environment behavior model 500, according to an example embodiment of the present disclosure. In an example, the environment behavior model 500 may be same as the environment behavior model 338 as described in FIG. 5. The order behavior model 500 (referred to as model 500 herein) may be related to manufacturing and shipping of goods pertaining to an order. The model 500 may be treated as an example of the environment behavior model 338. It should be understood that there can be many similar behavior models that the system 110 could make for various orders. The system 110 may make multiple behavior models for a single order. As described above, all the behavior models are stored in a library and are used for augmentation, formation, deployment of present and future models. Any of the behavior models may be used for intelligent order processing. Any of the components of the system 110 may be involved in construction and working of the model 500.

In accordance with an example of the present disclosure, the model 500 includes a step of receiving an order 502. The order received 502 may be similar to the order received 320 as described by FIG. 3. In an example, the order received 502 may be different from the order received 320. In the illustrated example, the model 500 incorporates 3 pathways for order received 502. First pathway may be wherein the order received 502 is a commodity which the service provider has in stock. Second pathway may be wherein the order received 502 is a commodity which the service provider has in stock but not in sufficient number of units in order to fulfill requirements of the order received 502. Third pathway may be wherein, the order received may be a commodity that may be one of a kind and may require manufacturing in order to fulfill requirements of the order received 502. The model 500 may be so configured that it would query the procurement related sources continuously and choose one of the 3 pathways mentioned above and described herein. These 3 pathways are presented below.

In an example, wherein the order received 502 is a commodity which the service provider has in stock, the order received 502 may be sent to an inventory unit 504. The inventory unit 504 would provide information regarding sufficient number of units present in the inventory 504 in order to fulfill requirements of the order received 502. The order received 502 may be sent to a warehouse 506 if sufficient number of units present in the inventory 504 in order to fulfill requirements of the order received 502.

In an example, wherein the order received 502 is a commodity which the service provider has in stock but not in sufficient number of units in order to fulfill requirements of the order received 502. The model provides an insufficiency indication 510. The insufficiency indication 510 send the order received 502 to a scheduling unit 514. The scheduling unit 514 may be configured to schedule manufacture of the goods pertaining to order received 502. The scheduling unit 514 may send the order received 502 to a tool calibration unit 516. The tool calibration unit 516 may perform research on the order received 502 for calibrating tools and machinery for manufacturing goods in order to fulfill requirements of the order received 502. Upon successful tool calibration, the order received 502 may be sent to a manufacturing and assembly unit 518 and confirmation is sought by the order tracker 230 regarding complete manufacturing and assembly of the goods related to order received 502.

In an example, the manufacturing and assembly unit 518 is unable to conform to the manufacturing requirements of the order received 502, the model 500 records a manufacturing exception 520. In such an example, the order tracker 230, may then constantly query the procurement related sources related to the order regarding manufacturing information. The resolver 270 would perform remediation or alert stakeholders regarding the manufacturing exception 520. The process would continue till the manufacturing exception 520 is resolved and the manufacturing and assembly unit 518 confirmation is received by the order tracker 230. In an example, the model augmenter 280 would record the manufacturing exception 520 for future reference and updating of model 500. In an example the model 500 may be constructed so that the issue predictor 240 may predict the manufacturing exception 520 and the resolver 270 may perform proactive remediation so that the manufacturing exception 520 may be circumvented. Subsequent to the confirmation from the manufacturing and assembly unit 518, the order received 502 may be sent to the warehouse 506.

In an example, wherein, the order received may be a commodity that may be one of a kind and may require manufacturing in order to fulfill requirements of the order received 502. The model 500 provides an indication 512. The indication 512 may indicate that one of a kind handling and manufacturing may be required for fulfillment of the order received 502. The order received is sent to the scheduling unit 514. All the steps described above for the second pathway wherein the order received 502 is a commodity which the service provider has in stock but not in sufficient number of units in order to fulfill requirements of the order received 502 are repeated hereon. The steps are not mentioned again for sake of brevity and simplicity of the document.

All three pathways described above lead to the order received 502 being sent to the warehouse 506. In an example, illustrated in FIG. 5, the order received 502 may be sent an international shipping unit 522 from the warehouse 506. The system 110 may receive a confirmation regarding the same. In an example, there is an issue with the shipping of the order, the model 500 records the same as a shipping exception 526. The order tracker 230, may then constantly query the procurement related sources related to the order regarding shipping information. The resolver 270 would perform remediation or alert stakeholders regarding the shipping exception 526. The process would continue till the shipping exception 526 is resolved and confirmation from international shipping unit 522 is received by the order tracker 230. In an example, the model augmenter 280 would record the shipping exception 526 for future reference and updating of model 500. In an example the model 500 may be constructed so that the issue predictor 240 may predict the shipping exception 526 and the resolver 270 may perform proactive remediation so that the shipping exception 526 may be circumvented.

In the illustrated example, the order received 502 may be sent to a domestic shipping unit 524 from the international shipping unit 522. The system 110 may receive a confirmation regarding the same. In an example, there is an issue with the shipping of the order, the model 500 records the same as a shipping exception 528. The order tracker 230, may then constantly query the procurement related sources related to the order regarding shipping information. The resolver 270 would perform remediation or alert stakeholders regarding the shipping exception 528. The process would continue till the shipping exception 528 is resolved and confirmation from international shipping unit 524 is received by the order tracker 230. In an example, the model augmenter 280 would record the shipping exception 528 for future reference and updating of model 500. In an example the model 500 may be constructed so that the issue predictor 240 may predict the shipping exception 524 and the resolver 270 may perform proactive remediation so that the shipping exception 528 may be circumvented. Subsequently, a confirmation 530 may be received by the system 110 when goods have been received by the client.

The order tracker 230 of the system 110 may continuously query the procurement related sources and gain a confirmation and order status from any of the scheduling unit 514, the tool calibration unit 516, and the manufacturing unit and assembly unit 518, the warehouse 506, the international shipping unit 522, the domestic shipping unit 524 and confirmation 530 for goods being received.

Figure 6:
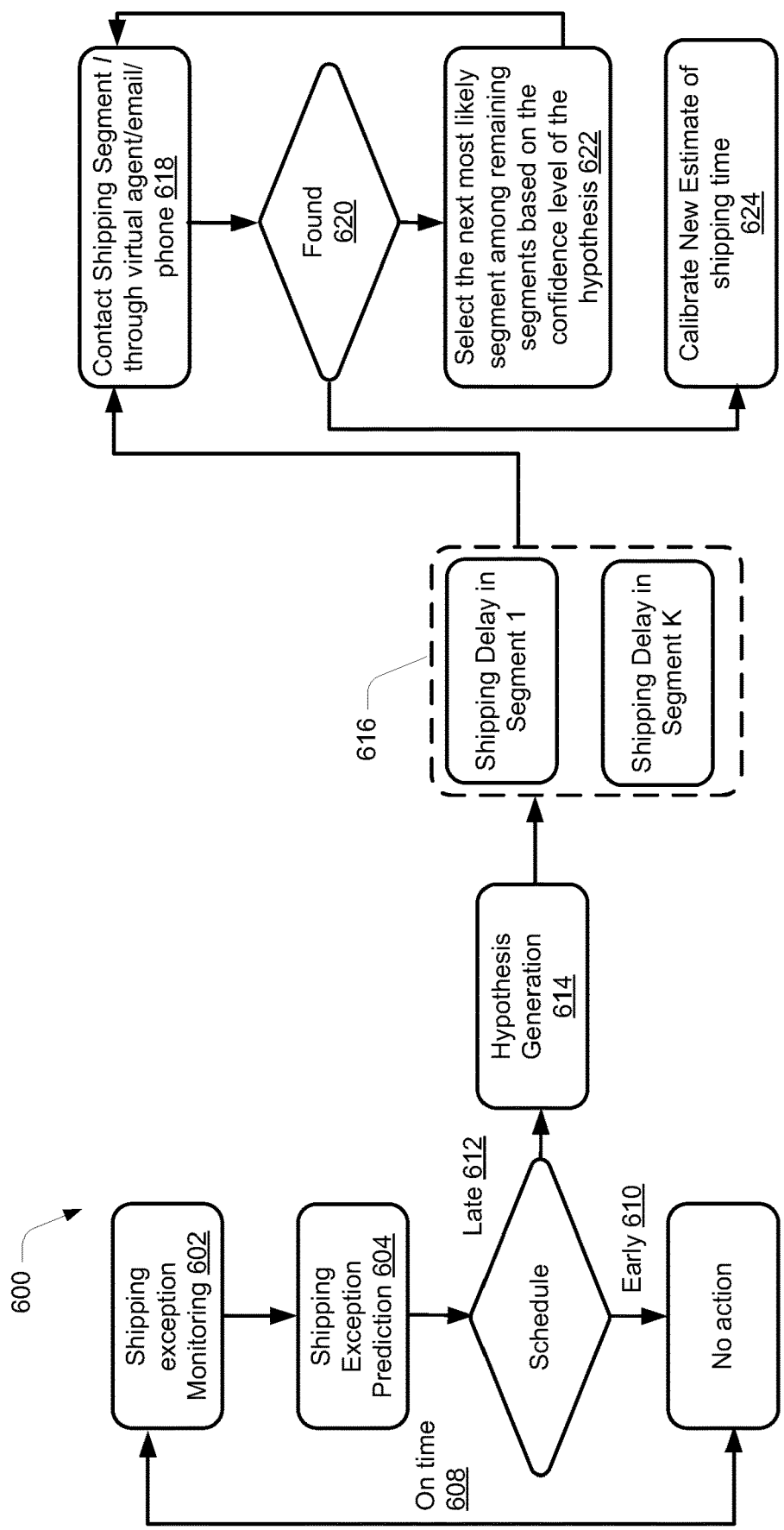
FIG. 6 illustrates monitoring and an automatic investigation of an order, according to an example embodiment of the present disclosure.

FIG. 6 illustrates a monitoring and an automatic investigation model 600 of an order, according to an example embodiment of the present disclosure.

As described above the updater 150 of the system 110 is to investigate previously encountered issues during any of the historical procurement interactions to identify the issue affecting the order. The updater 150 may also comprise the model augmenter 280 for augmentation, updating and calibration of behavior models. In the illustrated monitoring and automatic investigation model 600 (referred to as model 600 herein) illustrates monitoring for retrieval status of an order and investigation for previously encountered issues an investigation for order conforming to the behavior model. The model 600 may require deployment of any of the components of the system 110.

In an example, the model 600 related to shipping of goods related to an order. As described above the order tracker 230 may interact with procurement-specific data sources for retrieval of status of the order. In an example, a shipping exception 602 may be detected while processing an order. The order may be similar to any of the order 306, 320, 402, and 502. In an example, there is an issue with the shipping of an order, the model 600 records the same as the shipping exception 602. The order tracker 230, may then constantly query the procurement related sources related to the order regarding shipping information. The behavior identifier 210 may monitor procurement-specific data sources associated with the shipping exception 602. The behavior identifier 210 may identify an operation behavioral pattern from the monitored procurement-specific data relevant for exception 302. The modeler 220 would construct a behavior model for based on the operation behavioral pattern related to shipping exception 602. The issue predictor 240 may use the model deployer 260 deploy the behavior model to a shipping prediction 604. The prediction 604 may be a potential event relating to the order received to be fulfilled using the procurement interaction. The order tracker 230 would monitor the shipping exception 602 by querying various procurement specific data sources. Once recorded, the shipping exception 602 would be marked for the shipping prediction 604. The system 110 is configured so that the behavior model constructor 130 and the updater 150 would continuously monitor the prediction 604.

In an example, as illustrated by model 600 the shipping prediction 604 may follow one of the 3 pathways presented hereunder. A first pathway may be the shipping of the order to be in time, a second pathway may be the shipping of the order to be earlier than expected, and a third pathway may be the shipping of the product may be delayed. Each of these are explained in detail hereunder. As mentioned, the first pathway may be, the shipping prediction 604 would predict the shipping of the order to be in time as depicted by block 608. In such an example, the shipping prediction 604 is routed back to monitoring of shipping exception 602. Second pathway may be, the shipping prediction 604 would predict the shipping of the order to be early as depicted by block 610. In such an example, the shipping prediction 604 is routed back to monitoring of shipping exception 602. As mentioned previously, third pathway may be, the shipping prediction 604 would predict the shipping of the order to be late as depicted by the block 612. In such an example, the model augmenter 280 may generate a hypothesis 614. The hypothesis 614 may be based on a pre-existing behavior model library 616. For example, the library 616 may comprise shipping delays in various segments. The hypothesis 614 may choose a segment wherein the shipping delay may be explained for the block 612. The dialog manager 250 of the system 110 may then initiate a communication 618. The communication 618 may be an electronic mail, a telephone call, a virtual agent and the like. The communication 618 is explained in detail by way of FIG. 7 below. Subsequently, the model 600 will find a reason 620 for shipping delay, based on hypothesis 614 and the communication 618. Further, the model 600 could make a selection 622. The selection 622 may be a new segment, which may have been causing shipping delay based on confidence level of hypothesis 614. The process of initiating the communication 618 described above may be repeated by model 600. Further, the model 600 a new estimate 624 of the shipping time. It must be understood that any of the components of the system 110 described may be used to carry out the technique described through the model 600.

In an example, the resolver 270 would perform remediation or alert stakeholders regarding the delay 612. The process would continue till the delay 612 is resolved and confirmation of on time delivery 608 is received by the order tracker 230. In an example, the model augmenter 280 would record the delay 612 for future reference and updating of model 600. In an example the model 600 may be constructed so that the issue predictor 240 may predict the delay 612 and the resolver 270 may perform proactive remediation so that the delay 612 may be circumvented.

Figure 7:
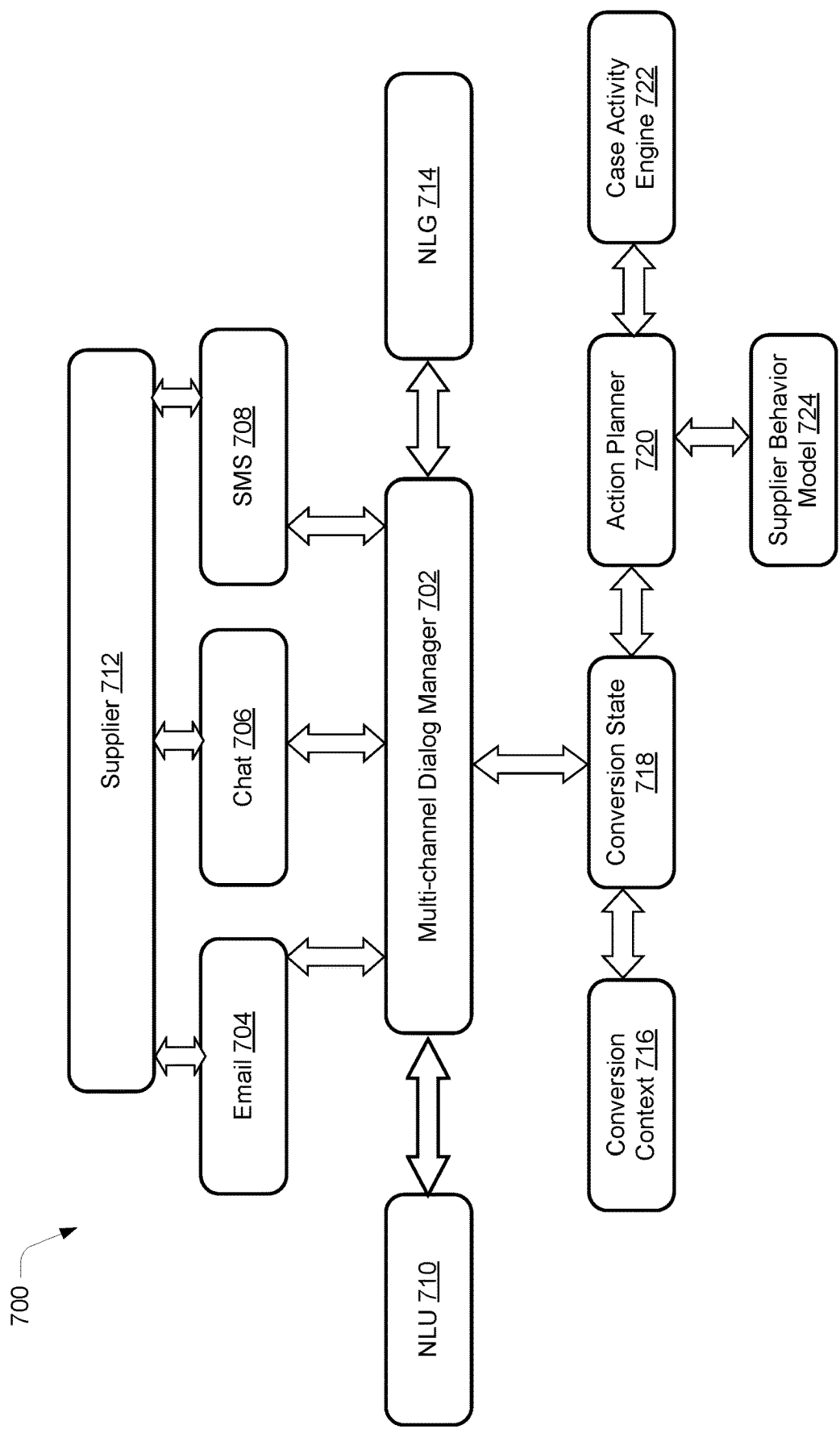
FIG. 7 illustrates an example of dialog management for remediation of an issue related to fulfillment of an order, according to an example embodiment of the present disclosure.

FIG. 7 illustrates an example of dialog management for remediation of an issue related to fulfillment of an order, according to an example embodiment of the present disclosure. The FIG. 7 illustrates a dialog management model 700, which should be treated as an example only. In an example, the dialog manager 250 may be used to carry out the technique described herein. It should be understood that any of the components of the system 110 may be used to carry out the technique described herein. The model 700 may include a multichannel dialog manager 702. In an example, the multichannel dialog manager 702 may use techniques like Natural Language Generation (NLG) 714 and Natural Language Understand (NLU) 710. The NLG 714 and NLU 710 may be well known to a person skilled in art and would not be explained here for sake of brevity the document. The multichannel dialog manager 702 initiates interaction with a supplier 712. The interaction may be in form of for example, an electronic mail 704, a chat 706, or an SMS 708. The multichannel dialog manager 702 may interact with a supplier behavior model 724. The supplier behavior model 724 may be a new model constructed by the behavior model constructor 130. In an example, the supplier behavior model 724 may be one of the pre-existing models stored in the system 110. The interaction of the multichannel dialog manager 702 and the supplier behavior model 724 may be facilitated through a conversion 718. The conversion 718 may include the communication received from the supplier 712. In an example, the conversion 718 may be configured to decipher a conversion context 716. In an example, the conversion 718 may also include information from an action planner 720. The action planner 720 may be derived from a case activity engine 722. The action planner 720 and case activity engine 722 may include information about various investigations carried out by the updater 150 upon the supplier behavior model 724. The conversion 718 may act as an interface between the supplier behavior model 724 and the multichannel dialog manager 702.

Figure 8:
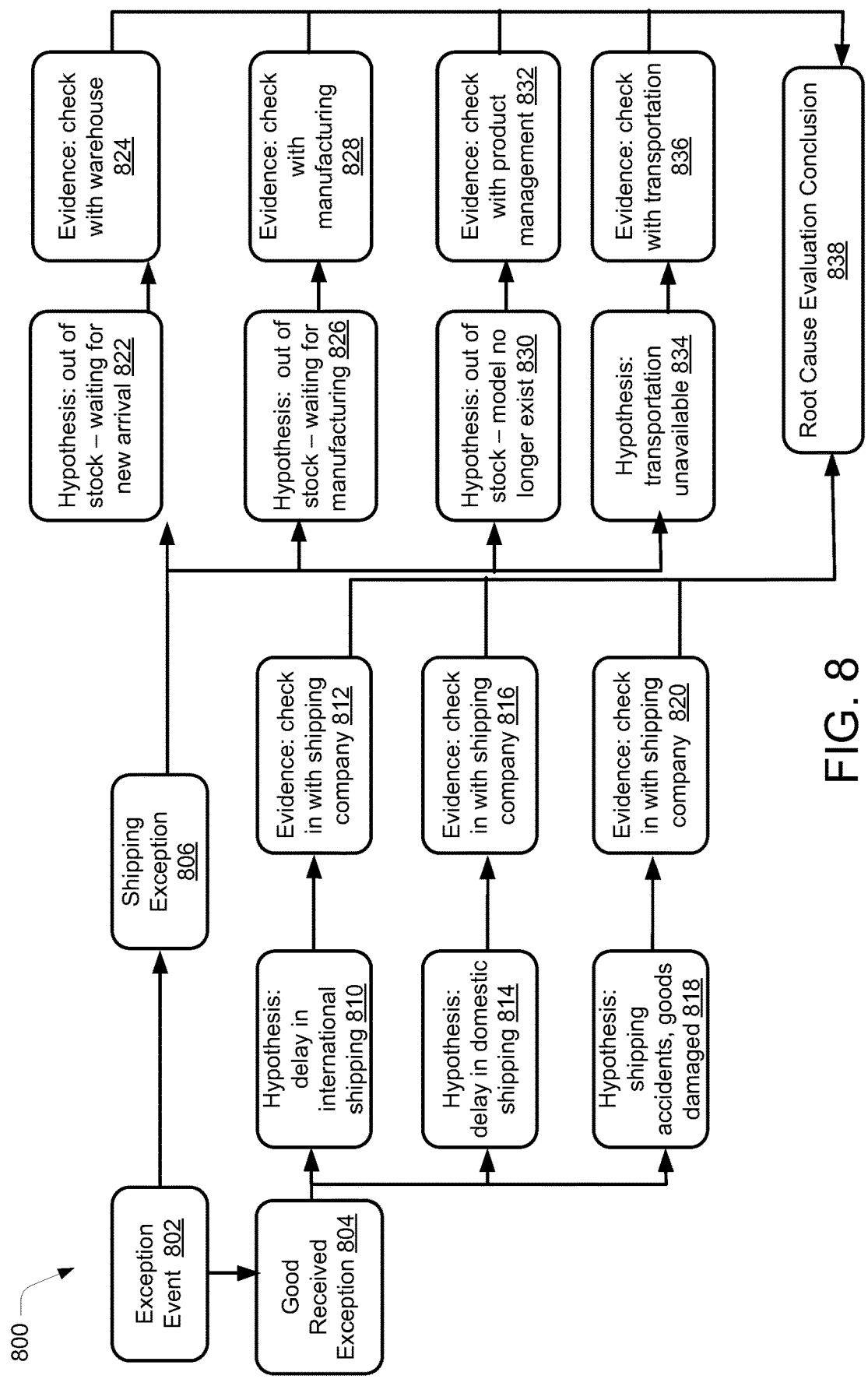
FIG. 8 illustrates hypothesis generation and evidence collection for remediation of an issue related to fulfillment of an order, according to other example embodiment of the present disclosure.

FIG. 8 illustrates hypothesis generation and evidence collection for remediation of an issue related to fulfillment of an order, according to other example embodiment of the present disclosure. FIG. 8 illustrates a case 800, which illustrates the investigation carried by the updater 150 through the issue predictor 240 and the model augmenter 280. As described above, the model deployer 260 of the issue predictor 240 may be configured to generate a hypothesis based on historical data; and provide a recommendation based on the hypothesis to remediate the issue. Also, the model augmenter 280 may be configured to investigate the order to determine whether the order conforms to the behavioral model or not, based on the operation behavioral pattern associated with the order. Also, the model augmenter 280 may generate a hypothesis for the order, when the order does not conform to the behavioral model. In an example, the model augmenter 280 may incorporate the hypothesis in the behavioral model to predict the potential event. The case 800 describes process of hypothesis generation and evidence collection so as to form a basis for remediation.

The case 800 may include recording an exception event 802. The model deployer 260 may investigate and find for example, two types of exceptions possible for the exception event 802. These exceptions may include a goods received exception 804 and a shipping exception 806. The model deployer 260 may investigate further each of the goods received exception 804 and the shipping exception 806 and arrive at different hypothesis for each. Each hypothesis may then be investigated for evidence in order to determine confidence level of the hypothesis. It should be noted that the hypothesis formed and evidence collected for the goods received exception 804 may also be interconnected with the hypothesis formed and evidence collected for the shipping exception 806. In an example, the shipping exception 806 may lead to a hypothesis 822, a hypothesis 826, a hypothesis 830, and a hypothesis 834 (explained below). Fore sake of brevity, all hypothesis and evidence are explained hereunder, and one of ordinary skill in the art will appreciate that each hypothesis, and accompanying evidence may be connected with every other hypothesis and accompanying evidence.

In an example, the goods received exception 804 may lead to a hypothesis that there may be a delay in shipping. The model deployer 260 may investigate further and forms a hypothesis 810 referring to delay in international shipping, a hypothesis 814 referring to delay in domestic shipping and a hypothesis 818 referring to delay due to shipping accidents or good being damaged. The hypothesis 810 may lead to the system 110 to perform a check 812 with shipping company responsible for international shipping of order related to the goods received exception 804. In an example, the system 110 may use the order tracker 230 and the dialog manager 250 for performing the check 812. The check 812 may form the evidence for recommending a course of action for the hypothesis 810, The hypothesis 814 may lead to the system 110 to perform a check 816 with shipping company responsible for domestic shipping of order related to the goods received exception 804. In an example, the system 110 may use the order tracker 230 and the dialog manager 250 for performing the check 816. The check 816 may form the evidence for recommending a course of action for the hypothesis 814. The hypothesis 818 may lead to the system 110 to perform a check 820 with shipping company responsible for shipping of order related to the goods received exception 804. In an example, the system 110 may use the order tracker 230 and the dialog manager 250 for performing the check 820, The check 820 may form the evidence for recommending a course of action for the hypothesis 818.

The hypothesis 822 may refer to a good being out of stock and waiting for its arrival. The hypothesis 822 may lead to the system 110 to perform a check 824 with the warehouse company responsible for warehousing of an order related to the shipping exception 806. In an example, the system 110 may use the order tracker 230 and the dialog manager 280 for performing the check 824. The check 824 may form the evidence for recommending a course of action for the hypothesis 822. In an example, the hypothesis 826 may refer to goods being out of stock and may be waiting for manufacturing. The hypothesis 826 may lead to the system 110 to perform a check 828 with manufacturing company responsible for manufacturing of order related to the goods received exception 804. In an example, the system 110 may use the order tracker 230 and the dialog manager 250 for performing the check 828. The check 828 may form the evidence for recommending a course of action for the hypothesis 826. In an aspect, the hypothesis 830 may refer to goods being out of stock and may be no longer in production. The hypothesis 830 may lead to the system 110 to perform a check 832 with management of the product manufacturing company responsible for manufacturing of order related to the goods received exception 804. In an example, the system 110 may use the order tracker 230 and the dialog manager 250 for performing the check 832. The check 832 may form the evidence for recommending a course of action for the hypothesis 830. In an example, the hypothesis 834 may refer to transportation being unavailable. The hypothesis 834 may lead to the system 110 to perform a check 836 with the transport company responsible for transportation of order related to the goods received exception 804. In an example, the system 110 may use the order tracker 230 and the dialog manager 250 for performing the check 836. The check 836 may form the evidence for recommending a course of action for the hypothesis 834.

In an example, all checks mentioned above 812, 816, 820, 824, 828, 832, 836 may lead the system 110 to a conclusion 838. The conclusion 838 may include a root cause analysis of the hypothesis and supporting evidence. The model deployer 260 may then deploy the behavior model to predict a potential event relating to the order received to be fulfilled using the procurement interaction, based on the behavior model, wherein the potential event is indicative of an issue affecting the order. The resolver 270 may proactively remediate the issue affecting the order to automatically troubleshoot the order. The model augmenter 280 may incorporate each of the hypothesis and supporting evidence in the behavioral model to predict the potential event. It should be noted that any of the components of the system 110 may be used to carry out the technique presented by way of the case 800.

Figure 9:
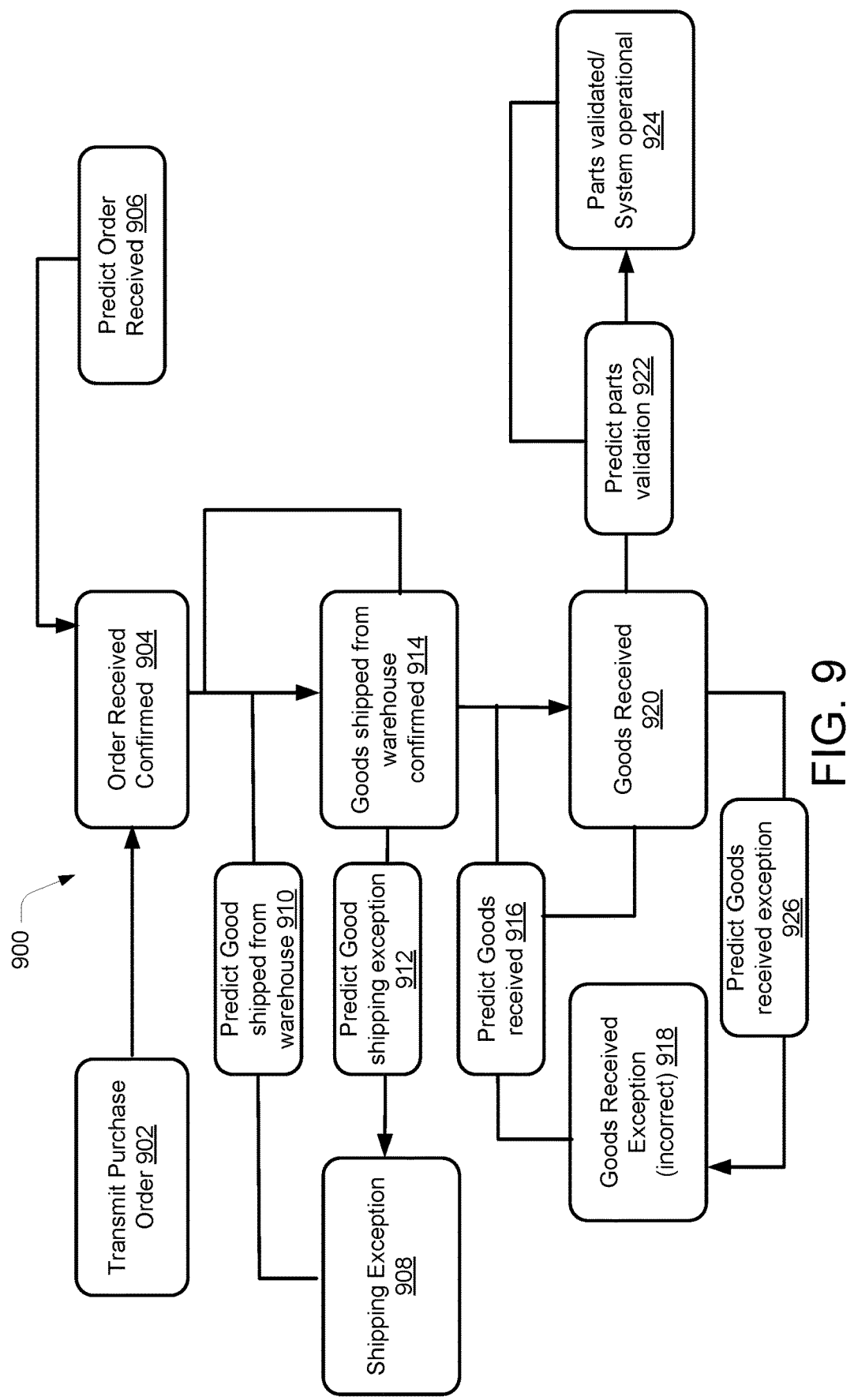
FIG. 9 illustrates an example of next order prediction based on the order behavior model of FIG. 4, according to an example embodiment of the present disclosure.

FIG. 9 illustrates an example of next order prediction based on the order behavior model of FIG. 4, according to an example embodiment of the present disclosure. The FIG. 9 illustrates an order behavior model 900 (referred to as model 900 herein), which demonstrates next order prediction based on the order behavior model 400 of FIG. 4. In an example, the model 900 may be different than the order behavior model 400.

The order behavior model 900 may be related to shipping of goods pertaining to an order. It should be understood that there can be many similar behavior models that the system 110 could make for various orders. The system 110 may make multiple behavior models for a single order. As described above, all the behavior models are stored in a library and are used for augmentation, formation, deployment of present and future models. Any of the behavior models may be used for intelligent order processing.

In accordance with an example of the present disclosure, the order behavior model 900 includes a step of transmitting purchase order at block 902. The purchase order may be the purchase order 306 purchase order 402. The purchase order may be a new order different from the purchase order 306 or the purchase order 402. The transmitted purchase order 902 is followed by a receiving a confirmation 904. In an example, the confirmation 904 may be received from the side of service provider if the system 110 has been deployed by the client. In an example, the confirmation 904 may be received from the side of client if the system 110 has been deployed by the service provider. The issue predictor 240 may be configured to make a prediction 906 for receiving the confirmation 904.

After receiving confirmation 904, the model 900 received a confirmation 914 regarding shipping of the goods included in the order from the warehouse. In an example, there is an issue with the shipping of the order, the model 900 records the same as a shipping exception 908. The order tracker 230, may then constantly query the procurement related sources related to the order regarding shipping information. The resolver 270 would perform remediation or alert stakeholders regarding the shipping exception 908. The process would continue till the shipping exception 908 is resolved and the confirmation 914 is received by the order tracker 230. In an example, the model augmenter 280 would record the shipping exception 908 for future reference and updating of model 900. In an example the model 900 may be constructed so that the issue predictor 240 may make a prediction 912. The prediction 912 may refer to a potential event of the shipping exception 908 occurring and the resolver 270 may perform proactive remediation so that the shipping exception 908 may be circumvented. Similarly, the system 110 may be configured to make a prediction 910 for receiving the confirmation 914.

In an example, a confirmation 920 may be received by the system 110 when goods have been received by the client. In an example, goods may not be received by the client, then a receiving exception 918 is recorded by the model 900. The receiving exception 918 may also be recorded if incorrect goods may be received by the client. The order tracker 230, may then constantly query the procurement related sources related to the order regarding good receiving information. The resolver 270 would perform remediation or alert stakeholders regarding the receiving exception 918. The process would continue till the receiving exception 918 is resolved and confirmation 920 is received by the order tracker 230. In an example, the model augmenter 280 would record the receiving exception 918 for future reference and updating of model 900. In an example the model 900 may be constructed so that the issue predictor 240 may make a prediction 916. The prediction 916 may refer to a potential event of the receiving exception 918 and the resolver 270 may perform proactive remediation so that the receiving exception 918 may be circumvented. Similarly, the system 110 may be configured to make a prediction 926 for receiving the confirmation 920. The prediction 926 may refer to the occurrence of the potential event of the receiving exception 918.

Subsequent to receiving the confirmation 920, the model 900 includes a validation 924. The validation 924 may include checking if good or service received are correct. In an example the model 900 may be constructed so that the issue predictor 240 may make a prediction 922. The prediction 922 may refer to a potential event of the validation 924 not working as per requirements. The resolver 270 may perform proactive remediation so that the potential event of the validation 924 not working as per requirements may be circumvented. In an example, any of the components of the system 110 may be involved in construction and working of the model 900.

Figure 10:
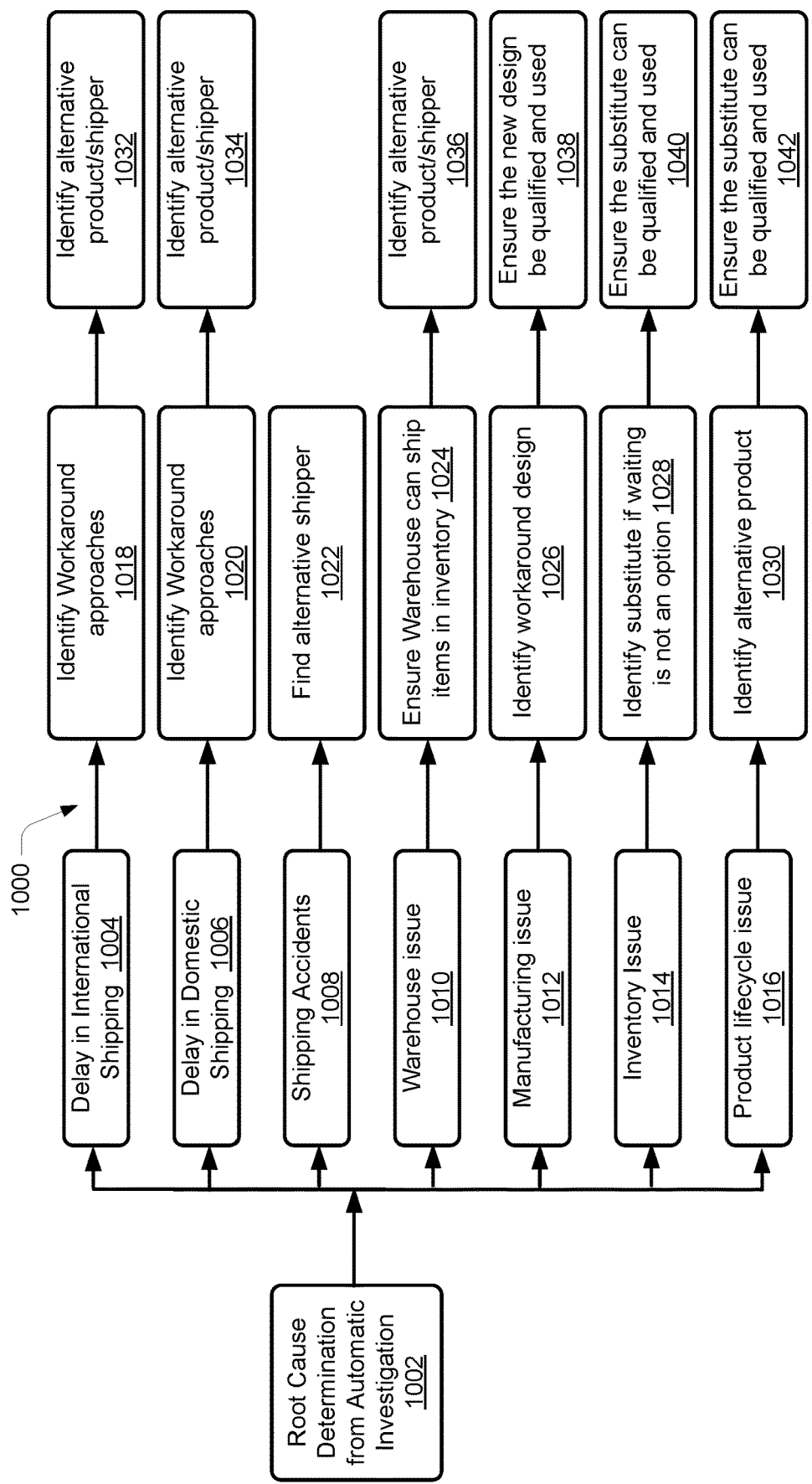
FIG. 10 illustrates an example of remediation for an issue related to fulfillment of an order, according to an example embodiment of the present disclosure.

FIG. 10 illustrates an example of remediation for an issue related to fulfillment of an order, according to an example embodiment of the present disclosure. FIG. 10 illustrates an example case 1000 related to root cause determination from an automatic investigation carried out by the system 110 as described above as well. The case 1000 can be a follow up case after the case 800, which illustrates the investigation carried by the updater 150 through the issue predictor 240 and the model augmenter 280. The case 1000 may include a root cause determination 1002. The root cause determination 1002 may be a result of the investigation carried by the updater 150 through the issue predictor 240 and the model augmenter 280. As mentioned above by way of FIG. 8 all checks of case 800-812, 816, 820, 824, 828, 832, 836 may lead the system 110 to the conclusion 838. The conclusion 838 may include a root cause analysis of the hypothesis and supporting evidence. The conclusion 838 may same as the rot cause determination 1002. The root cause determination 1002 may be different from the conclusion 838. The root cause determination 1002 may lead to determination of remediation actions. In an example, the resolver 270 may be configured to proactively remediate the issue affecting the order to automatically troubleshoot the order. It should be understood that any of the components of the system 110 may be used for remediation described herein.

In the example case 1000, the root cause determination 1002 leads the determination of various issues that may be the potential events affecting the order. Each of the potential may lead to different remediation approaches that may be deployed by the resolver 270 or the system 110 for proactive remediation of the issues. Explained hereunder are various issues that may be identified by the case 1000 and accompanying remedial action.

In an example, the root cause determination 1002 leads to an issue 1004 referring to delay in international shipping. The resolver 270 may then perform an identification 1018. The identification 1018 may include workaround approaches for remediating the issue 1004. The resolver 270 may deploy an approach 1032 as part of remediation of the issue 1004. The approach 1032 may include use of alternative products or shippers in order to circumvent the issue 1004, which refers to delay in international shipping. In an example, the root cause determination 1002 leads to an issue 1006 referring to delay in domestic shipping. The resolver 270 may then perform an identification 1020. The identification 1020 may include workaround approaches for remediating the issue 1006. The resolver 270 may deploy an approach 1034 as part of remediation of the issue 1006. The approach 1034 may include use of alternative products or shippers in order to circumvent the issue 1006, which refers to delay in domestic shipping. In an example, the root cause determination 1002 leads to an issue 1008 referring to shipping accidents. The resolver 270 may then perform an identification 1022. The identification 1018 may include finding an alternative shipper as a workaround approaches for remediating the issue 1008. The resolver 270 may deploy the approach found through identification 1022 as part of remediation of the issue 1008.

In an example, the root cause determination 1002 leads to an issue 1010 referring to warehouse issues. The resolver 270 may then perform an identification 1024. The identification 1024 may include finding out that warehouse can ship items to inventory remediating the issue 1010. The resolver 270 may deploy an approach 1036 as part of remediation of the issue 1010. The approach 1036 may include use of alternative products or shippers in order to circumvent the issue 1010, which refers to warehouse issues. In an example, the root cause determination 1002 leads to an issue 1012 referring to manufacturing issues. The resolver 270 may then perform an identification 1026. The identification 1026 may include finding out workaround designs for remediating the issue 1012. The resolver 270 may deploy an approach 1038 as part of remediation of the issue 1012. The approach 1038 may include ensuring that new design is qualified as per order requirements and may be used.

In an example, the root cause determination 1002 leads to an issue 1014 referring to inventory issues. The resolver 270 may then perform an identification 1028. The identification 1028 may include finding out substitutes if waiting for inventory is not an option for remediating the issue 1014. The resolver 270 may deploy an approach 1040 as part of remediation of the issue 1014. The approach 1040 may include ensuring that substitute is qualified as per order requirements and may be used. In an example, the root cause determination 1002 leads to an issue 1016 referring to inventory issues. The resolver 270 may then perform an identification 1030. The identification 1028 may include finding out substitutes or alternative products for remediating the issue 1016. The resolver 270 may deploy an approach 1042 as part of remediation of the issue 1016. The approach 1042 may include ensuring that substitute is qualified as per order requirements and may be used.

Figure 11:
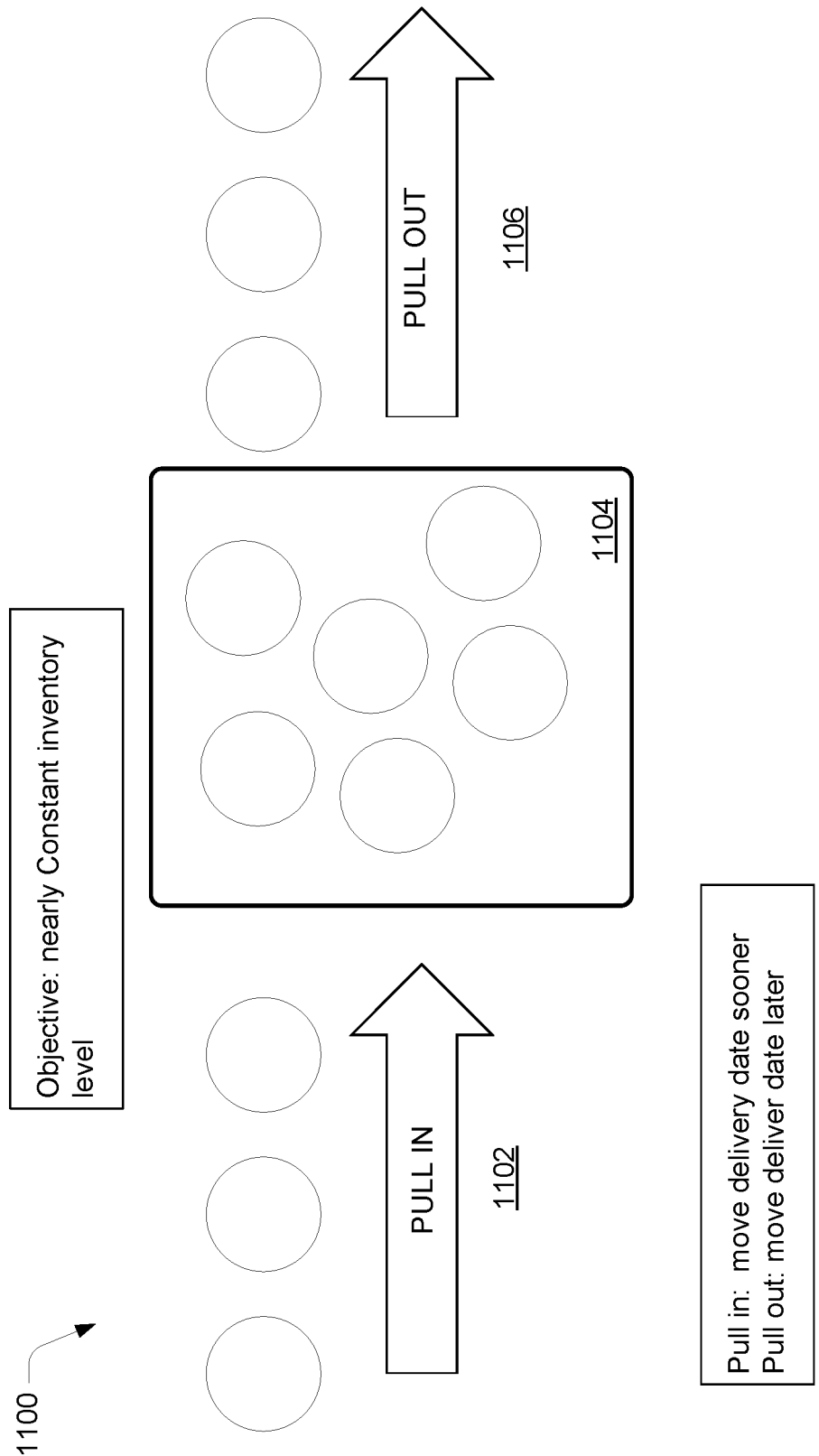
FIG. 11 illustrates an example of a constant inventory maintenance resulting from deployment of the intelligent order concierge, in accordance with an example embodiment of the present disclosure.

FIG. 11 illustrates an example of a constant inventory maintenance resulting from deployment of the intelligent order concierge, in accordance with an example embodiment of the present disclosure. The FIG. 11 illustrates a case 1100 wherein a client or a service provider may be able to maintain a near constant state of inventory from the deployment of the system 110. The case 1100 may be described using three inventory segments, namely, an incoming segment 1102, an inventory segment 1104, and an outgoing segment 1106 The incoming segment 1102 may refer to goods, which may be procured for the inventory segment 1104. The outgoing segment 1106 may refer to the goods that may leave the inventory segment 604 to be used elsewhere or shipped out—as per requirements. The case 1100 may deploy the system 110 for maintaining a constant state of the inventory segment 1104. For example, when an increase in the incoming segment 1102 may be detected, the system 110 may assist in scheduling a delivery date at a time earlier than what had been planned otherwise. When an increase in the outgoing segment 1106 may be detected, the system 110 may assist in scheduling a delivery date at a time later than what had been planned otherwise. A constant level of inventory segment 1104 may be ensured therein.

Figure 12:
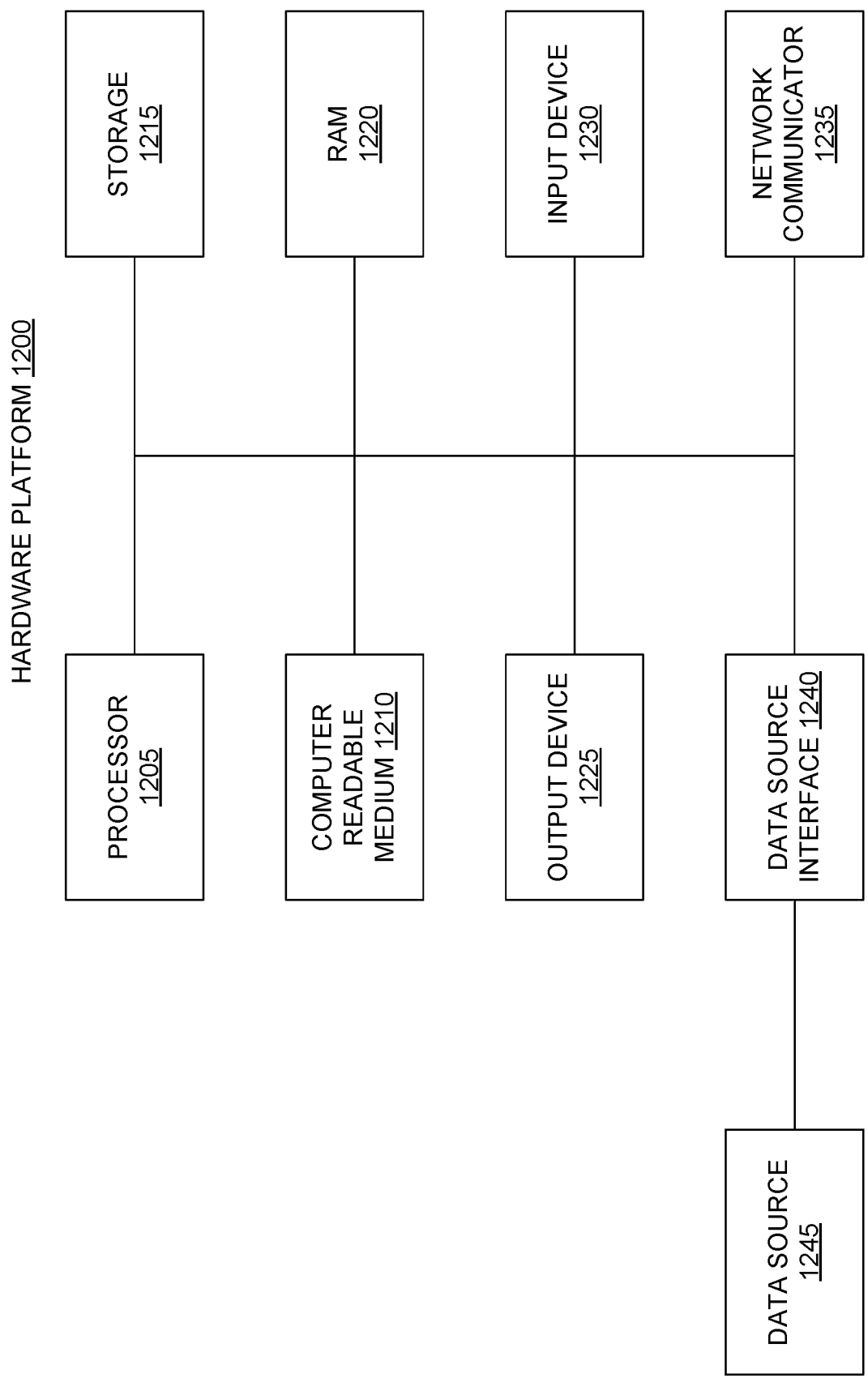
FIG. 12 illustrates a hardware platform for implementation of the system, according to an example embodiment of the present disclosure.

FIG. 12 illustrates a hardware platform 1200 for implementation of the system 110, according to an example of the present disclosure. Particularly, computing machines such as but not limited to internal/external server clusters, quantum computers, desktops, laptops, smartphones, tablets and wearables which may be used to execute the system 110 or may have the structure of the hardware platform 1200. The hardware platform 1200 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Referring to FIG. 12, the hardware platform 1200 may be a computer system 1200 that may be used with the examples described herein. The computer system 1200 may represent a computational platform that includes components that may be in a server or another computer system. The computer system 1200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1100 may include a processor 1205 that executes software instructions or code stored on a non-transitory computer readable storage medium 1210 to perform methods of the present disclosure. The software code includes, for example, instructions to perform the steps described with reference to the components of the system 110 in FIG. 1 to FIG. 11 previously. In an example, the processor 120, the behavior model constructor 130, the monitor 140, the updater 150 may be software codes or components performing these steps. In an example, the behavior identifier 210 modeler 220, the order tracker 230, the issue predictor 240, the model deployer 260, the resolver 270, the dialog manager 250, and the model augmenter 280 may be software codes or components performing these steps.

The instructions on the computer readable storage medium 1210 are read and stored the instructions in storage 1215 or in random access memory (RAM) 1220. The storage 1215 provides a large space for keeping static data where at least some instructions could be stored for later execution. The stored instructions may be further compiled to generate other representations of the instructions and dynamically stored in the RAM 1220. The processor 1205 reads instructions from the RAM 1220 and performs actions as instructed.

The computer system 1200 further includes an output device 1225 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1200 further includes input device 1030 to provide a user or another device with mechanisms for entering data and/or otherwise interact with the computer system 1200. The input device may include, for example, a keyboard, a keypad, a mouse, or a touchscreen. In an example, output of any component of the system 110 is displayed on the output device 1225. Each of these output devices 1225 and input devices 1230 could be joined by one or more additional peripherals.

A network communicator 1235 may be provided to connect the computer system 1200 to a network and in turn to other devices connected to the network including other clients, servers, data stores, and interfaces, for instance. The network communicator 1235 may include, for example, a network adapter such as a LAN adapter or a wireless adapter. The computer system 1200 includes a data source interface 1240 to access data source 1245. A data source is an information resource. As an example, a database of exceptions and inferencing rules may be a data source. Moreover, knowledge repositories and curated data may be other examples of data sources.

Figure 13:
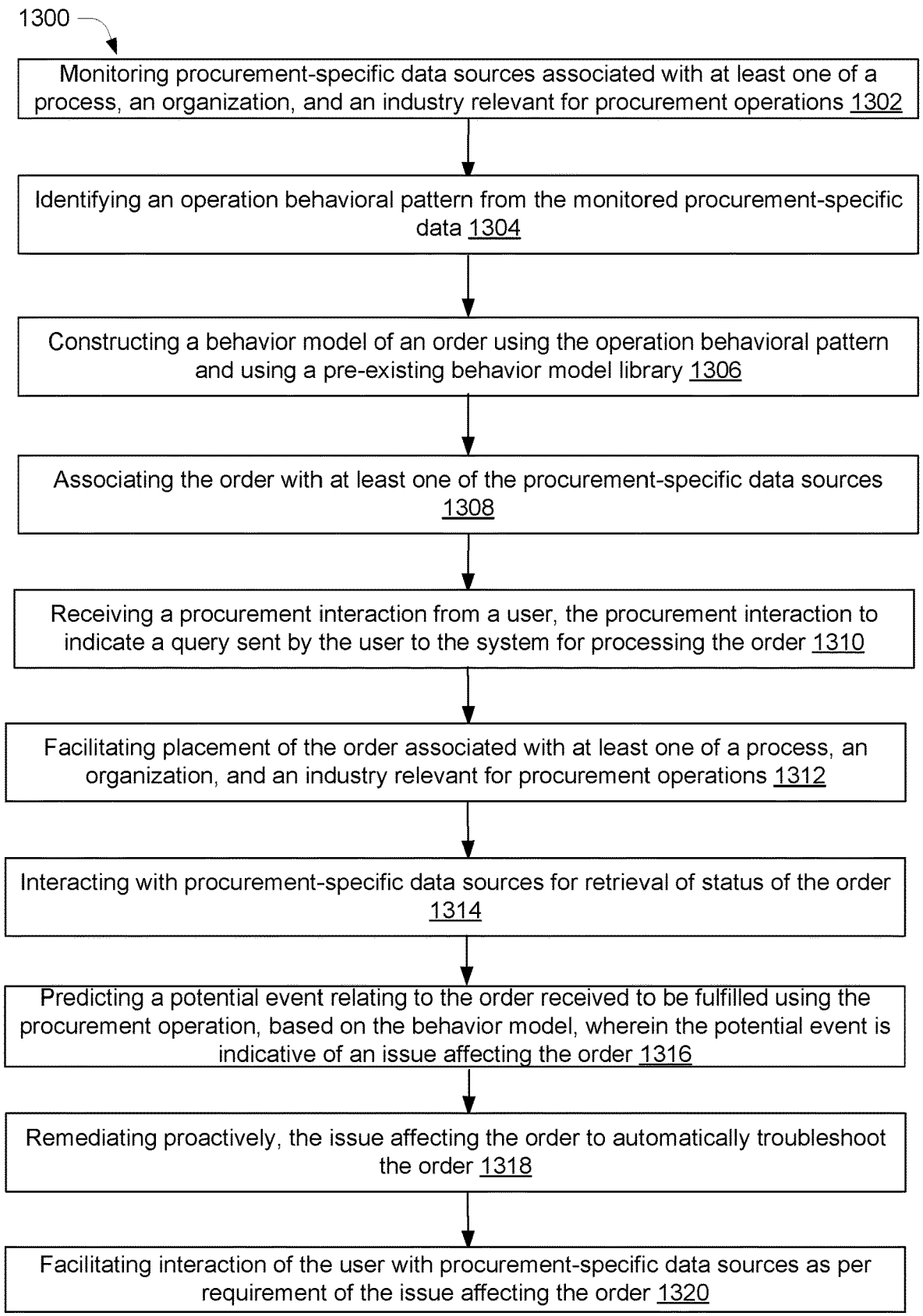
FIG. 13 illustrates a method of automated order troubleshooting, according to an example embodiment of the present disclosure.

FIG. 13 illustrates a method 1300 for intelligent order and purchase order concierge described by the system 110, according to an example embodiment of the present disclosure.

It should be understood that method steps are shown here for reference only and other combination of the steps may be possible. Further, the method 1300 may contain some steps in addition to the steps shown in the FIG. 13. For the sake of brevity, construction and operational features of the system 110 which are explained in detail in the description of FIG. 1, FIG. 2, FIG. 3, FIG. 4, FIG. 5, FIG. 6, FIG. 7, FIG. 8, FIG. 9, FIG. 10, FIG. 11, and FIG. 12 are not explained in detail in the description of FIG. 13. The method 1300 may be performed by a component of the system 110, such as the processor 120, the behavior model constructor 130, the monitor 140, and the updater 150.

The method 1300 for automated order troubleshooting may be implemented in three phases. In the first phase, the behavior model constructor 130 builds a behavior model, which captures operation behavioral pattern indicative of procurement-specific behavior associated with a process, and organization and industry, or a combination thereof, associated with the party implementing the system 110. In the second phase the monitor 140 receives a procurement interaction from a user, the procurement interaction to indicate a query sent by a user to the system for processing the order. The monitor 140 may facilitate placement of the order associated with at least one of a process, an organization, and an industry relevant for procurement operations. In the third phase then, the updater 150 deploys the behavioral model when the order is placed or received, as the case may be. In an example, the updater 150 deploys the behavior model to predict a potential event relating to the order received to be fulfilled using the procurement interaction described by way of FIG. 1. In an example, the potential event may be an issue affecting the order. In an example, the updater 150 deploys the behavior model to gauge if the issue affecting the order may be related to manufacturing of the order, if the order requires manufacturing of a product before delivery. In an example, the updater 150 deploys the behavior model to gauge the issue affecting the order may be related to shipping of the order after it has left the service provider site and is in transit to client site. Accordingly, the updater 150 may initiate an automatic remediation for the issue to mitigate or completely prevent the order from being affected.

Referring to the method 1300, at block 1302, procurement-specific data sources associated with a process, an organization, an industry, or a combination thereof relevant for sales operations can be monitored. In an example, the process, the organization, and the industry that relevant to the sales operation can be selected based on the operation of the party implementing the techniques of the present disclosure. The monitoring of the procurement operations can be achieved, in real-time, by querying various data bases and repositories of information, online as well as offline, from which the relevant data can be retrieved. For example, social media, online web portals, and other websites that carry information regarding the process, the organization, the industry, or a combination thereof can be crawled by for retrieving and monitoring the above mentioned information.

Further, at block 1304, an operation behavioral pattern can be identified based on the procurement-specific data.

Subsequently, at block 1306, a behavior model of an order using the operation behavioral pattern and using a pre-existing behavior model library. In an example, a pre-existing behavior model library can be the basis for constructing the behavior model. For instance, the pre-existing behavior model library can serve as a template for generating the behavior model which attempts to mimic the operation behavioral pattern.

At block 1308, the order is associated with at least one of the procurement-specific data sources.

At block 1310, a procurement interaction is received from a user. The procurement interaction may indicate a query sent by the user to the system for processing the order the order is assessed in view of the behavior model.

At block 1312, placement of the order associated with at least one of a process, an organization, and an industry relevant for procurement operations may be facilitated.

At block 1314, interaction may be facilitated with procurement-specific data sources for retrieval of status of the order. In an example, the interacting with procurement-specific data sources comprises tracing trace the order from placement of the order to final delivery of the order with procurement-specific data sources for retrieval of status of the order.

At block 1316 any potential event relating to the order received to be fulfilled using the procurement operation is predicted based on the behavior model. The potential event is indicative of an issue that can affect the order directly or indirectly. In an example predicting the potential event comprises investigating previously encountered exceptions during previously encountered issues during any of the historical procurement interactions to identify the issue affecting the order. In an example, the predicting comprises investigating the order to determine whether the order conforms to the behavioral model or not, based on the operation behavioral pattern associated with the order. In an example, the predicting comprises generating a hypothesis for the order, when the order does not conform to the behavioral model. In an example, the predicting comprises incorporating the hypothesis in the behavioral model to predict the potential event.

At block 1318, the issue affecting the order to automatically troubleshoot the order may be remediated proactively. In an example, the remediating may comprise generating a hypothesis based on historical data. In an example the remediating may comprise providing a recommendation based on the hypothesis to remediate the issue.

At block 1320, interaction of the user with procurement-specific data sources as per requirement of the issue affecting the order may be facilitated.

Further, the method 1300 may comprise generating an alert for the user, in response to the prediction of the potential event. In an example, the method 1300 may comprise generating an automated communication with at least one of the procurement-specific data sources and the user after prediction of the issue affecting the order.

What has been described and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
    a processor; and
    a memory storing instructions, which when executed by the processor, cause the system to:
    monitor procurement-specific data sources associated with at least one of a process, an organization, and an industry relevant for procurement operations, wherein the monitoring is performed by continuously querying the procurement-specific data sources to retrieve procurement-specific data;
    identify an operation behavioral pattern from the procurement-specific data based on predefined rules, wherein the identified behavioral pattern indicates current trends, future trends, and difference in the current trends from previous trends for the procurement specific data, wherein the operation behavioral pattern is further indicative of procurement specific behavior associated with the at least one of the process, the organization, and the industry relevant for procurement operations;

construct a behavior model for an order, by capturing the operation behavioral pattern and using a pre-existing behavior model library, wherein the pre-existing model library serves as a template for generating the behavior model that attempts to mimic the operation behavioral pattern, wherein the behavior model is any or a combination of an order behavior model and an environment behavior model;

associate the order with at least one of the procurement-specific data sources;

receive a query sent by a user to the system for processing the order;

facilitate placement of the order associated with the at least one of the process, the organization, and the industry relevant for procurement operations based on the behavior model and the received query;

retrieve a status of the order by interacting with the procurement-specific data sources to track data associated with the procurement operations from the placement of the order to final delivery of the order;

determine whether the order conforms to the behavioral model, based on the operation behavioral pattern associated with the order by determining whether the order falls within a category of a known behavioral pattern;

when the order does not conform to the behavioral model:

generate a hypothesis for the order to generate a new behavioral pattern, the hypothesis representing that the behavioral model is unable to accurately mirror the operation behavioral pattern, wherein the hypothesis comprises predicting shipping delay in segments of procurement operations;

perform changes in the behavioral model by incorporating the new behavioral pattern in the behavioral model to predict a potential event;

upon performing the changes in the behavioral model, deploy the tracking data and the behavior model to predict the potential event relating to the order received to be fulfilled using the procurement interaction, based on the behavior model, wherein the potential event is indicative of an issue affecting the order, and wherein the potential event captures potential failure in the procurement operations;

upon the prediction of the potential event, generate an automated communication with at least one of the procurement-specific data sources and the users through at least one of an electronic mail, a chat, or an SMS, by employing at least one of Natural Language Generation (NLG) and Natural Language Understand (NLU) techniques, wherein the automated communication is facilitated through deciphering a conversion context based on information received from the user;

select a shipping segment among the shipping segments of the procurement operations based on a confidence level of the hypothesis and communicate with the selected shipping segment; and proactively remediate the issue affecting the order based on the predicted event by identifying automated workaround approaches for remediating the issue, the automated workaround approaches including deploying an alternative product, shipper, workaround design, or inventory substitution.

2. The system as claimed in claim 1, wherein the processor is to: generate the hypothesis based on historical data; and provide a recommendation based on the hypothesis to remediate the issue.

3. The system as claimed in claim 1, wherein the processor is to investigate previously encountered issues during any of the historical procurement interactions to identify the issue affecting the order.

4. The system as claimed in claim 1, wherein the processor is to generate an alert for the user, in response to the prediction of the potential event.

5. The system as claimed in claim 1, wherein the processor is to generate an automated communication with at least one of the user and the procurement-specific data sources after prediction of the issue affecting the order.

6. A method comprising:

monitoring procurement-specific data sources associated with at least one of a process, an organization, and an industry relevant for procurement operations, wherein the monitoring is performed by continuously querying the procurement-specific data sources to retrieve procurement-specific data;

identifying an operation behavioral pattern from the procurement-specific data based on predefined rules, wherein the identified behavioral pattern indicates current trends, future trends, and difference in the current trends from previous trends for the procurement specific data, wherein the operation behavioral pattern is further indicative of procurement specific behavior associated with the at least one of the process, the organization, and the industry relevant for procurement operations;

constructing a behavior model of an order, by capturing the operation behavioral pattern and using a pre-existing behavior model library, wherein the pre-existing model library serves as a template for generating the behavior model that attempts to mimic the operation behavioral pattern, wherein the behavior model is any or a combination of an order behavior model and an environment behavior model;

associating the order with at least one of the procurement-specific data sources;

receiving a query sent by a user to the system for processing the order;

facilitating placement of the order associated with the at least one of the process, the organization, and the industry relevant for procurement operations based on the behavior model and the received query;

retrieving a status of the order by interacting with the procurement-specific data sources to track data associated with the procurement operations from the placement of the order to final delivery of the order;

determining whether the order conforms to the behavioral model, based on the operation behavioral pattern associated with the order by determining whether the order falls within a category of a known behavioral pattern;

when the order does not conform to the behavioral model, generating a hypothesis for the order to generate a new behavioral pattern, the hypothesis representing that the behavioral model is unable to accurately mirror the operation behavioral pattern, wherein the hypothesis comprises predicting shipping delay in segments of procurement operations;

performing changes in the behavioral model by incorporating the new behavioral pattern in the behavioral model to predict a potential event;

upon performing the changes in the behavioral model, deploying the tracking data and the behavior model to predict the potential event relating to the order received to be fulfilled using the procurement interaction, based on the behavior model, wherein the potential event is indicative of an issue affecting the order, and wherein the potential event captures potential failure in the procurement operations;

upon the prediction of the potential event, generating an automated communication with at least one of the procurement-specific data sources and the user, through at least one of an electronic mail, a chat, or an SMS, by employing at least one of Natural Language Generation (NLG) and Natural Language Understand (NLU) techniques, wherein the automated communication is facilitated through deciphering a conversion context based on information received from the user;

selecting a shipping segment among the shipping segments of the procurement operations based on a confidence level of the hypothesis and communicating with the selected shipping segment; and proactively remediating the issue affecting the order based on the predicted event by identifying automated workaround approaches for remediating the issue, the automated workaround approaches including deploying an alternative product, shipper, workaround design, or inventory substitution.

7. The method as claimed in claim 6, wherein the remediating comprises: generating the hypothesis based on historical data; and providing a recommendation based on the hypothesis to remediate the issue.

8. The method as claimed in claim 6, wherein the predicting the potential event comprises investigating previously encountered exceptions during previously encountered issues during any of the historical procurement interactions to identify the issue affecting the order.

9. The method as claimed in claim 6, further comprising generating an alert for the user, in response to the prediction of the potential event.

10. The method as claimed in claim 6, further comprising generating an automated communication with at least one of the user and the procurement-specific data sources after prediction of the issue affecting the order.

11. A non-transitory computer readable medium including machine readable instructions that are executable by a processor to:

monitor procurement-specific data sources associated with at least one of a process, an organization, and an industry relevant for procurement operations, wherein the monitoring is performed by continuously querying the procurement-specific data sources to retrieve procurement-specific data;

identify an operation behavioral pattern from the monitored procurement-specific data based on predefined rules, wherein the identified behavioral pattern indicates current trends, future trends, and difference in the current trends from previous trends for the procurement specific data, wherein the operation behavioral pattern is further indicative of procurement specific behavior associated with the at least one of the process, the organization, and the industry relevant for procurement operations;

construct a behavior model of an order, by capturing the operation behavioral pattern and using a pre-existing behavior model library, wherein the pre-existing model library serves as a template for generating the behavior model that attempts to mimic the operation behavioral pattern, wherein the behavior model is any or a combination of an order behavior model and an environment behavior model;

associate the order with at least one of the procurement-specific data sources;

receive a query sent by the user to the system for processing the order;

facilitate placement of the order associated with the at least one of the process, the organization, and the industry relevant for procurement operations based on the behavior model and the received query;

retrieve a status of the order by interacting with the procurement-specific data sources to track data associated with the procurement operations from the placement of the order to final delivery of the order;

determine whether the order conforms to the behavioral model, based on the operation behavioral pattern associated with the order by determining whether the order falls within a category of a known behavioral pattern;

when the order does not conform to the behavioral model, generate a hypothesis for the order to generate a new behavioral pattern, the hypothesis representing that the behavioral model is unable to accurately mirror the operation behavioral pattern, wherein the hypothesis comprises predicting shipping delay in segments of procurement operations;

perform changes in the behavioral model by incorporating the new behavioral pattern in the behavioral model to predict a potential event;

upon performing the changes in the behavioral model, deploy the tracking data and the behavior model to predict the potential event relating to the order received to be fulfilled using the procurement interaction, based on the behavior model, wherein the potential event is indicative of an issue affecting the order, and wherein the potential event captures potential failure in the procurement operations;

upon the prediction of the potential event, generate an automated communication with at least one of the procurement-specific data sources and the user, through at least one of an electronic mail, a chat, or an SMS, by employing at least one of Natural Language Generation (NLG) and Natural Language Understand (NLU) techniques, wherein the automated communication is facilitated through deciphering a conversion context based on information received from the user;

select a shipping segment among the shipping segments of the procurement operations based on a confidence level of the hypothesis and communicate with the selected shipping segment; and proactively remediate the issue affecting the order based on the predicted event by identifying automated workaround approaches for remediating the issue, the automated workaround approaches including deploying an alternative product, shipper, workaround design, or inventory substitution.

12. The non-transitory computer readable medium as claimed in claim 11, wherein the processor is to: generate the hypothesis based on historical data; and provide a recommendation based on the hypothesis to remediate the issue.

13. The non-transitory computer readable medium as claimed in claim 11, wherein the processor is to generate an alert for the user, in response to the prediction of the potential event.

14. The non-transitory computer readable medium as claimed in claim 11, wherein the processor is to generate an automated communication with at least one of the user and the procurement-specific data sources after prediction of the issue affecting the order.

\* \* \* \* \*

UNITED STATES PATENT AND TRADEMARK OFFICE
CERTIFICATE OF CORRECTION

| | |
|---|---|
| PATENT NO. | : 11,507,914 B2 |
| APPLICATION NO. | : 16/366773 |
| DATED | : November 22, 2022 |
| INVENTOR(S) | : Chung-Sheng Li et al. |

It is certified that error appears in the above-identified patent and that said Letters Patent is hereby corrected as shown below:

In the Claims

Claim 1, Column 27, Line 54, the phrase "and the users" should instead read "and the user".

Signed and Sealed this
First Day of August, 2023

*Katherine Kelly Vidal*

Katherine Kelly Vidal
*Director of the United States Patent and Trademark Office*